United States Patent
Sharma et al.

(10) Patent No.: US 11,102,832 B2
(45) Date of Patent: Aug. 24, 2021

(54) METHOD AND WIRELESS COMMUNICATION SYSTEM FOR HANDLING OFFLOADING OF DRBS TO WLAN CARRIER

(71) Applicant: Samsung Electronics Co., Ltd., Gyeonggi-do (KR)

(72) Inventors: Neha Sharma, Bangalore (IN); Mangesh Abhimanyu Ingale, Bangalore (IN); Rajavelsamy Rajadurai, Bangalore (IN); Jaehyuk Jang, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/531,602

(22) Filed: Aug. 5, 2019

(65) Prior Publication Data
US 2019/0357289 A1    Nov. 21, 2019

Related U.S. Application Data

(63) Continuation of application No. 15/241,860, filed on Aug. 19, 2016, now Pat. No. 10,375,751.

(30) Foreign Application Priority Data

Aug. 19, 2015   (IN) .................... 4338/CHE/2015 PS
Aug. 8, 2016    (IN) .................... 4338/CHE/2015 CS

(51) Int. Cl.
*H04W 76/15*   (2018.01)
*H04W 36/00*   (2009.01)
*H04W 84/12*   (2009.01)

(52) U.S. Cl.
CPC ....... *H04W 76/15* (2018.02); *H04W 36/0066* (2013.01); *H04W 84/12* (2013.01)

(58) Field of Classification Search
CPC .. H04W 76/15; H04W 36/0066; H04W 84/12
See application file for complete search history.

(56) References Cited

U.S. PATENT DOCUMENTS

2008/0049695 A1*   2/2008   Ogura ................... H04W 28/24
                                                            370/338
2014/0204771 A1    7/2014   Gao et al.
(Continued)

FOREIGN PATENT DOCUMENTS

WO    WO 2015/002767    1/2015
WO    WO 2015/178747    11/2015

OTHER PUBLICATIONS

Huawei, HiSilicon, Details of the GTP-U solution for LTE-WLAN aggregation, 3GPP TSG-RAN WG2 Meeting #90, Fukuoka, Japan, May 25-29, 2015, R2-152657. (Year: 2015) (Year: 2015).*

(Continued)

*Primary Examiner* — Shailendra Kumar
(74) *Attorney, Agent, or Firm* — The Farrell Law Firm, P.C.

(57) ABSTRACT

A method by a wireless local area network (WLAN) termination (WT) node in a second radio access technology (RAT) is provided. The method includes receiving, from a base station in a first RAT, a WT addition request message including quality of service (QoS) parameters for at least one bearer; identifying access category information for the at least one bearer, based on the QoS parameters received from the base station; transmitting, to the base station, a WT addition request acknowledge message including an identity of admitted bearer among the at least one bearer and access category information of the admitted bearer based on the admitted bearer being an uplink bearer, the access category information of the admitted bearer being forwarded from the (Continued)

base station to a terminal; and receiving, from the terminal, data based on the access category information.

20 Claims, 21 Drawing Sheets

(56) References Cited

U.S. PATENT DOCUMENTS

| | | | | |
|---|---|---|---|---|
| 2014/0241317 | A1 | 8/2014 | Jamadagni et al. | |
| 2014/0370898 | A1* | 12/2014 | Saily | H04W 48/16 455/436 |
| 2015/0003435 | A1* | 1/2015 | Horn | H04W 28/24 370/338 |
| 2015/0049707 | A1* | 2/2015 | Vajapeyam | H04W 76/19 370/329 |
| 2015/0109927 | A1* | 4/2015 | Ozturk | H04W 40/20 370/235 |
| 2017/0111822 | A1* | 4/2017 | Jung | H04W 24/08 |

OTHER PUBLICATIONS

Intel Corporation, User Plane Aspects of LWA, 3GPP TSG-RAN2 Meeting #91, Beijing, P.R.China, Aug. 24-28, 2015, R2-153513 (Year: 2015).*
Indian Examination Report dated Jan. 28, 2020 issued in counterpart application No. 4338/CHE/2015, 6 pages.
Huawei, HiSilicon, Details of the GTP-U Solution for LTE-WLAN aggregation, R2-152657, 3GPP TSG-RAN WG2 Meeting #90, May 25-29, 2015, 4 pages.
Broadcom Corporation, "Providing Per Bearer Qos Handling Over WLAN", R2-153727, 3GPP TSG-RAN WG2 #91, Aug. 24-28, 2015, 3 pages.
Intel Corporation, "User Plane Aspects of LWA", R2-153513, 3GPP TSG-RAN2 Meeting #91, Aug. 24-28, 2015, 4 pages.
International Search Report dated Nov. 28, 2016 issued in counterpart application No. PCT/KR2016/009198, 3 pages.
European Search Report dated Jul. 13, 2018 issued in counterpart application No. 16837362.9-1231, 6 pages.
Chinese Office Action dated Jun. 23, 2021 issued in counterpart application No. 201680047156.2, 6 pages.

* cited by examiner

METHOD AND WIRELESS COMMUNICATION SYSTEM FOR HANDLING OFFLOADING OF DRBS TO WLAN CARRIER

PRIORITY

This continuation application which claims priority 35 U.S.C. § 120 to U.S. patent application Ser. No. 15/241,860, filed on Aug. 19, 2016 in the United States Patent and Trademark Office, which claimed priority under 35 U.S.C. § 119(a) to an Indian Provisional Patent Application filed on Aug. 19, 2015 in the Indian Patent Office and assigned Serial No. 4338/CHE/2015 (PS), and an Indian Complete Patent Application filed on Aug. 8, 2016 in the Indian Patent Office and assigned Serial No. 4338/CHE/2015 (CS), the entire disclosure of each of which is incorporated herein by reference.

BACKGROUND

1. Field of the Disclosure

The present disclosure relates generally to the field of long term evolution (LTE), and more particularly, to handling of an LTE data radio bearer (DRB) offloaded to a wireless local area network (WLAN).

2. Description of the Related Art

Current wireless technology efficiently utilizes the licensed frequency spectrum to provide maximum data rate to a user of a user equipment (UE). Even though advances in the wireless technology such as LTE networks have increased the performance and capacity of wireless networks, this alone may not be sufficient to meet the data rate demand of the future.

Third generation partnership project (3GPP) specifications provide mechanisms to meet the data rate demand of a UE, using means such as carrier aggregation (CA) or dual connectivity (DC) by adding radio resources to a UE. For example, a UE may be configured with component carrier #1 and component carrier #2, where both of these aggregated carriers are transmitted using LTE radio access technology (RAT). Integration and/or aggregation of multiple RATs using the DC framework, where an LTE RAT and a WLAN RAT are aggregated at a radio layer are being explored. Such multiple RAT aggregation enables the addition of radio resources to a UE from the unlicensed band along with radio resources in the licensed band, providing efficient and appropriate usage of the unlicensed spectrum. A WLAN radio working in the unlicensed spectrum for example, in the 2.4 GHz or 5.0 GHz band, may be aggregated if a UE is served by LTE carrier(s) such that aggregation of WLAN radio resources happens at the radio layer. A DC framework specified by 3GPP in Release-12 can be exploited such that a data radio bearer (DRB) established for a UE on an LTE carrier may be split below a packet data convergence protocol (PDCP) layer and offloaded to a WLAN over a standardized interface so that user plane packets (data packets) may be transmitted over an LTE air-interface and/or a WLAN air-interface respectively. An established DRB considered for offload may be either a downlink (DL) DRB and/or an uplink (UL) DRB.

If such offloading of user plane packets occurs at the PDCP layer, in accordance with an existing 3GPP standard, a wireless terminal (WT) node of a WLAN may be unable to understand the LTE quality of service (QoS) characteristics of the DRB for applying them for the data packets transmitted over the WLAN air interface. Thus, LTE QoS characteristics must be mapped to WLAN QoS characteristics for the DRB offloaded to the WLAN. Without the mapping, there may be difficulty in maintaining the expected QoS of a user, which effectively degrades the user experience.

Further, there is a need for a flow control mechanism to control data rate for offloaded data packets transmitted between an LTE node (eNB) and a WT node. Without the flow control mechanism, this may lead to congestion of user data packets (PDCP packet data units (PDUs)) transmitted between an LTE node and a WT node.

SUMMARY

An aspect of the present disclosure provides a method and wireless communication system for handling offloading of one or more DRBs of a UE served by an LTE carrier to a WLAN carrier of a WLAN at a PDCP layer, wherein data packets on an offloaded DRB are PDCP PDUs.

Another aspect of the present disclosure provides a method of offloading one or more DRBs by mapping LTE QoS parameters of the offloaded DRB to WLAN QoS parameters at a LTE node or a WT node of the WLAN.

Another aspect of the present disclosure provides a method of implementing a flow control mechanism at a WT node to control a data rate at which data packets of an offloaded DRB are received by the WT node from an LTE node.

According to an aspect of the present disclosure a method by a wireless local area network (WLAN) termination (WT) node in a second radio access technology (RAT) is provided. The method includes receiving, from a base station in a first RAT, a WT addition request message including quality of service (QoS) parameters for at least one bearer; identifying access category information for the at least one bearer, based on the QoS parameters received from the base station; transmitting, to the base station, a WT addition request acknowledge message including an identity of admitted bearer among the at least one bearer and access category information of the admitted bearer based on the admitted bearer being an uplink bearer, the access category information of the admitted bearer being forwarded from the base station to a terminal; and receiving, from the terminal, data based on the access category information.

BRIEF DESCRIPTION OF THE DRAWINGS

The above and other aspects, features, and advantages of the present disclosure will be more apparent from the following detailed description, taken in conjunction with the accompanying drawings, in which.

DETAILED DESCRIPTION OF EMBODIMENTS OF THE PRESENT DISCLOSURE

Figure 1A:
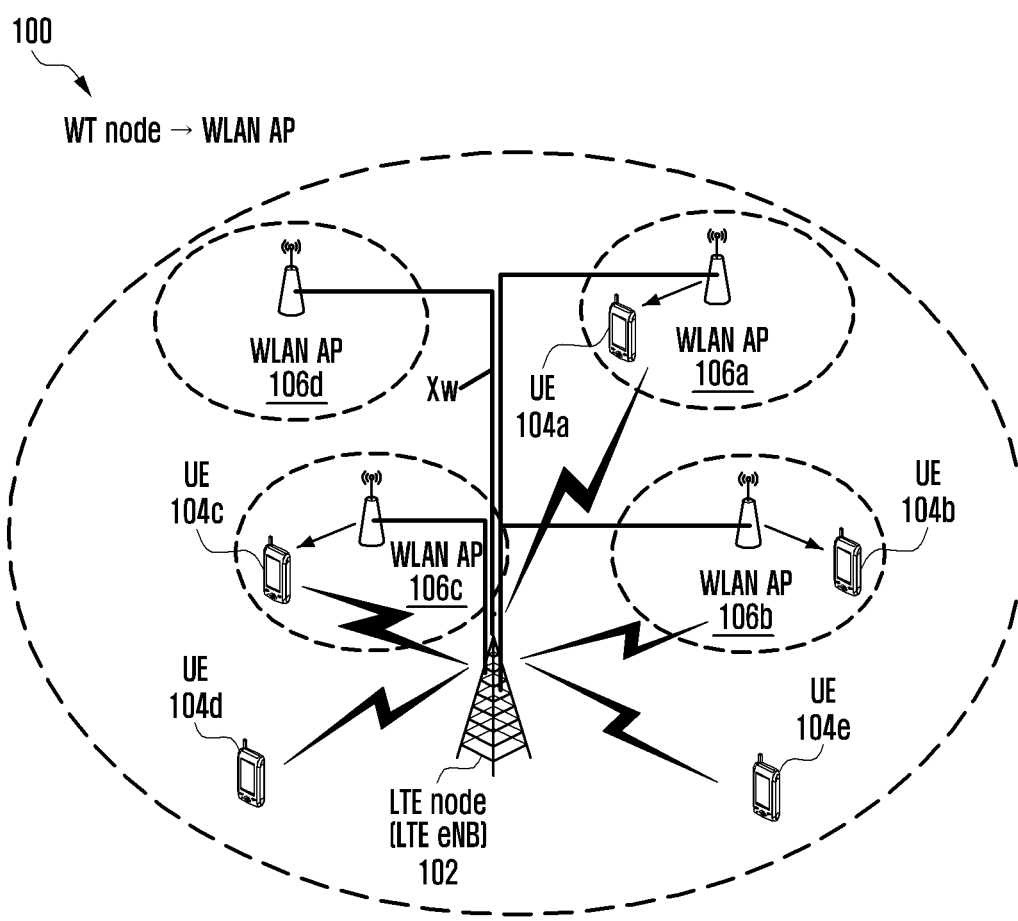
FIGS. 1A and 1B are diagrams of a wireless communication system providing aggregation of LTE RAT with WLAN RAT for offloading of DRBs served by an LTE carrier to a WLAN carrier served by a WLAN for a non-collocated deployment scenario, according to an embodiment of the present disclosure.

The embodiments of the present disclosure herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those skilled in the art to practice the embodiments herein. Accordingly, the examples are not intended to be construed as limiting the scope of the present disclosure, as defined by the appended claims and their equivalents.

The embodiments of the present disclosure herein achieve a method and wireless communication system for handling offloading of one or more DRBs of a UE. The DRBs served by an LTE carrier are offloaded to a WLAN carrier of a WLAN at a PDCP layer. The data packets on an offloaded DRB are PDCP PDUs. The offloaded DRB is assigned an LTE QoS parameter by an evolved packet core (EPC) if an evolved packet system (EPS) bearer is created. The method includes offloading one or more DRBs by mapping an LTE QoS parameter of the offloaded DRB to a WLAN QoS parameter at an LTE eNB or a WT node. In an embodiment of the present disclosure, the WT node may be a WLAN AP or a WLAN AG. Further, the method includes implementing a flow control mechanism at a WT node or at a UE to control a data rate at which data packets of offloaded DRB are received by the WT node from an LTE node.

In an embodiment of the present disclosure, a wireless communication system is a system enabling aggregation of an LTE RAT or an LTE network and a WLAN RAT or WLAN.

Throughout the present disclosure, a wireless communication system is described for a non-collocated deployment scenario. However, it is intended to be understood that a wireless communication system may be implemented for aggregation of an LTE RAT and a WLAN RAT at a radio layer for a collocated deployment scenario with minimum modification. In a collocated scenario, an LTE node and a WT node of a WLAN are physically located in the same physical node.

In an embodiment of the present disclosure, a UE may be a mobile phone, a tablet computer, a smartphone, a personal digital assistant, a laptop or any communication device supporting offloading of DRBs by aggregation of an LTE RAT and a WLAN RAT.

Thus, a method of the present disclosure facilitates an aggregation of an LTE RAT and a WLAN RAT at a radio layer by offloading LTE DRBs to a WLAN. Further, a method of the present disclosure provides mapping of an LTE QoS parameter to WLAN QoS parameters for an offloaded DRB to maintain a QoS associated with the DRB if data packets are scheduled through a WLAN RAT.

Referring to FIGS. 1 through 15, where similar reference characters denote corresponding features consistently throughout the figures, there are shown embodiments of the present disclosure.

Figure 1B:
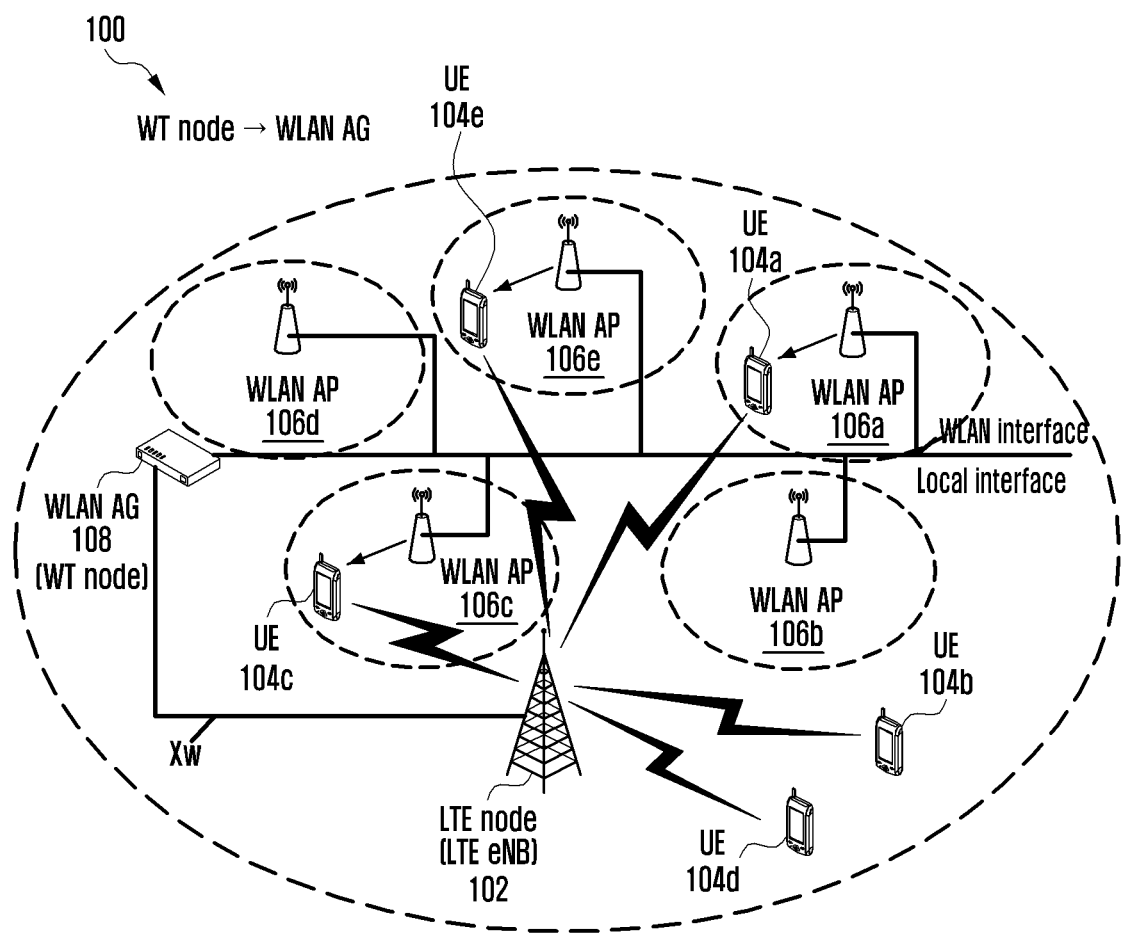

FIGS. 1A and 1B are diagrams of a wireless communication system 100 providing aggregation of LTE RAT with WLAN RAT for offloading of DRBs served by an LTE carrier to a WLAN carrier served by a WLAN for a non-collocated deployment scenario, according to an embodiment of the present disclosure.

FIG. 1A illustrates the wireless communication system 100, where a standardized interface connects an LTE node 102 and one or more WT nodes, wherein the WT nodes include WLAN APs 106a through 106d, respectively. For example, the standardized interface may be similar to an X2 interface (i.e., an interface for connecting neighboring eNBs in a peer to peer fashion to assist handover and provide a means for co-ordination of radio resources) and hereinafter an Xw interface. FIG. 1B illustrates the wireless communication system 100, where the LTE node 102 is connected to a single WT node through the Xw interface, wherein the WT node is a WLAN AG 108, alternatively referred to as a WLAN access controller. The WLAN AG or WLAN AC 108 may be configured to control multiple WLAN APs such as WLAN APs 106a through 106e through a local interface, for example, an ethernet. Further, the WLAN APs 106a through 106e serve one or more UEs on a WLAN interface.

In FIG. 1A, a plurality of UEs 104a through 104e supporting the capability of aggregating an LTE RAT and a WLAN RAT are served by the LTE node 102 on a licensed LTE carrier. UE 104a establishes a radio resource control (RRC) connection with the LTE node 102 on the licensed LTE carrier. There may be one or more DRBs established for a single UE 104a, thus, multiple DRBs may exist per UE. The UE 104d and the UE 104e, even though having capability to support LTE RAT and WLAN RAT aggregation, are served only on the licensed LTE carrier from the LTE node 102, as they are not in the coverage area of any WT node (WLAN APs 106a through 106d respectively). However, the UE 104a, 104b and 104c, respectively served by the LTE carrier of the LTE node 102, are within the coverage area of the WLAN APs 106a, 106b and 106c, respectively. Thus, the DRBs for UE 104a, 104b and 104c, respectively, may be offloaded to the WLAN carrier of the WLAN AP 106a, 106b and 106c, respectively.

In FIG. 1B, a plurality of UEs 104a through 104e supporting the capability of aggregating the LTE RAT and the WLAN RAT are served by the LTE node 102 on the licensed LTE carrier. The UE 104a establishes an RRC connection with the LTE node 102 on the licensed LTE carrier. There may be one or more DRBs established for a single UE 104a, thus, multiple DRBs may exist per UE. The UE 104b and the UE 104d, even though having capability to support LTE RAT and WLAN RAT aggregation, are served only on the licensed LTE carrier from the LTE node 102, as they are not in the coverage area of any WT node (WLAN APs 106a through 106e, respectively). However, the UE 104a, 104c and 104e, respectively served by the LTE carrier of the LTE node 102, are within the coverage of the WLAN APs 106a, 106c and 106e, respectively. Thus, the DRBs for UE 104a, 104c and 104e, respectively, may be offloaded to the WLAN carrier of the WLAN AP 106a, 106b and 106c, respectively, through the WLAN AG 108 (functioning as the WT node).

Thus, the WT node may be the WLAN AP or the WLAN AG. However, regardless of whether the WT node is the WLAN AP or the WLAN AG, procedures on an Xw interface for adding WLAN resources for a UE are the same. An Xw interface would therefore support control plane signaling and using a GTP-U tunnel to transport user plane data from the LTE node 102 to the WT node. The procedures on the Xw interface are also applicable for a collocated scenario where an LTE node and a WT node are physically located in the same physical node.

Figure 2:
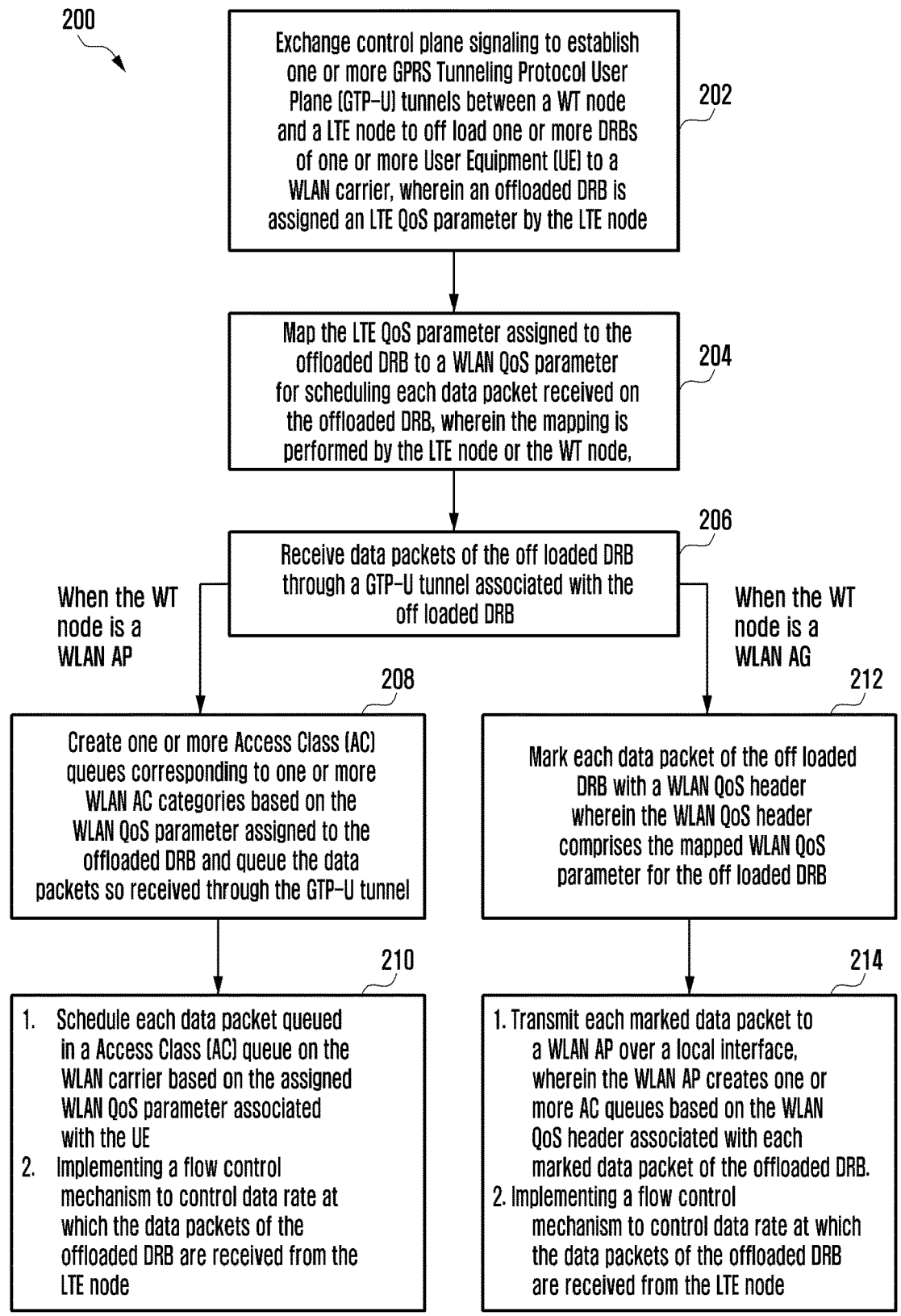
FIG. 2 is a flowchart of a method of offloading of DRBs served by an LTE carrier to a WLAN carrier served by a WLAN, according to an embodiment of the present disclosure.

FIG. 2 is a flowchart of a method of offloading of DRBs served by an LTE carrier to a WLAN carrier served by a WLAN, according to an embodiment of the present disclosure. If a suitable WT node is identified by the LTE node 102, then the LTE node 102 may add the WT node for offloading one or more DRBs of one or more UEs to the WLAN carrier served by the WT node (WLAN AP 106a or WLAN AG 108), wherein the WT node(s) are connected to the LTE node 102 through a standardized interface such as an Xw interface. An end-to-end protocol architecture to support an LTE RAT and a WLAN RAT aggregation at a radio layer using layer 2 transport for both a collocated scenario and a non-collocated scenario is described below with reference to FIG. 3. Further, steps for adding a WT node are described below with reference to FIGS. 5 and 6.

After a WT node is added, then, at step 202, the method 200 includes allowing the LTE node 102 to exchange control plane signaling with the WT node (WLAN AP 106a or WLAN AG 108) to establish one or more GTP-U tunnels for offloading one or more DRBs of one or more UEs within a coverage area of the WT node (WLAN AP 106a or WLAN AG 108). Here, DRBs of UE 106a lying within the coverage of the WLAN AP 106a that are initially served by an LTE carrier of the LTE node 102 may be offloaded to a WLAN carrier corresponding to the WT node (WLAN AP 106a or WLAN AG 108). After one or more DRBs are offloaded to the WT node (WLAN AP 106a or WLAN AG 108) then the offloaded DRB (each offloaded DRB) is assigned an LTE QoS parameter. Offloading of one or more DRBs to the WLAN carrier is performed at the PDCP layer, wherein data packets on the offloaded DRB are PDCP PDUs.

At step 204, the method 200 includes allowing the WT node (WLAN AP 106a or WLAN AG 108) or the LTE node 102 to map the LTE QoS parameter associated with the offloaded DRB to the WLAN QoS parameter to enable scheduling of each data packet received on the offloaded DRB on the WLAN air interface. Thus, mapping of LTE QoS parameters to WLAN QoS parameters may occur at either the LTE node 102 or the WT node (WLAN AP 106a or WLAN AG 108) and is implementation specific.

Embodiment of the present disclosure for mapping LTE QoS parameters to WLAN QoS parameters are described below with reference to FIG. 6. A plurality of LTE QoS parameters and WLAN QoS parameters that may be used, and the need for mapping between them, is described below after steps 206 through 214 are described.

At step 206, the method 200 includes allowing the WT node (WLAN AP 106a or WLAN AG 108) to receive data packets of the offloaded DRB through a GTP-U tunnel associated with the offloaded DRB. One or more GTU tunnels may be established per UE for one or more offloaded DRBs associated with a particular UE. Each data packet transported through a GTP-U tunnel, alternatively referred to as a tunnel, associated with the offloaded DRB includes a plurality of headers. The headers include a GTP header and a PDCP header. Further, the PDCP header includes a data radio bearer identity (DRB-ID) of the EPS bearer corresponding to the offloaded DRB. There is a one-to-one mapping between a DRB-ID and an E-RAB for a corresponding EPS bearer. Therefore the terms DRB-ID and E-RAB are used interchangeably in the present disclosure.

In an embodiment of the present disclosure, the offloaded DRB may be a downlink (DL) bearer established for the UE 104a.

In an embodiment of the present disclosure, the offloaded DRB may be an uplink (UL) bearer established for the UE 104a. In this case, the method 200 includes the LTE node 102 or the WT node (WLAN AP 106a or WLAN AG 108) informing the UE 104a of the mapped WLAN QoS parameter associated with the offloaded UL DRB.

In a scenario where the WT node is the WLAN AP 106a, at step 208, the method 200 includes the WT node (WLAN AP 106a) creating one or more access class (AC) queues per UE corresponding to one or more WLAN AC categories in accordance with the WLAN QoS parameter assigned to the offloaded DRB. The data packets received through the GTP-U tunnel associated with the offloaded DRB are queued in the appropriate AC queue. At step 210, the method 200 includes the WT node (WLAN AP 106a) scheduling, on the WLAN carrier, data packets queued in an AC queue, associated with the UE 104a, based on the mapped WLAN QoS parameter. A user plane packet (data packet) structure for PDCP PDUs offloaded to the WLAN using layer 2 transport, where the WT node is the WLAN AP 106a, is described below with reference to FIG. 4A. The creation of one or more AC queues and the buffering of data packets based on the mapped WLAN QoS parameter by the WLAN AP 106a are described below with reference to FIGS. 7A and 7B. In the method 200, the WT node (WLAN AP 106a or WLAN AG 108) implements the flow control mechanism at a WT node or at a UE to control a data rate at which data packets of an offloaded DRB are received from the LTE node 102. The flow control mechanism comprises providing the LTE node 102 with a delivery status of each data packet.

However, if an WT node is the WLAN AG 108, step 206 is followed by step 212, wherein, the method 200 includes the WT node (WLAN AG 108) marking each data packet of one or more offloaded DRBs with a WLAN QoS header. The WLAN QoS header of each data packet comprises the mapped WLAN QoS parameter for that offloaded DRB. At step 214, the method 200 includes the WT node (WLAN AG 108) transmitting each marked data packet to the WLAN AP 106a over a local interface. Further, the method 200 includes the WLAN AP 106a creating one or more AC queues per UE based on a WLAN QoS header associated with each marked data packet of one or more offloaded DRBs. Such QoS marking in the header of each data packet enables buffering of each data packet in an appropriate AC queue. The data packets from the AC queue associated with the UE 104a are then scheduled on a WLAN carrier based on the mapped WLAN QoS parameter. The user plane packet (data packet) structure for PDCP PDUs offloaded to the WLAN using layer 2 transport, where the WT node is the WLAN AG 108, is described below with reference to FIGS. 4B, 8A, and 8B. The method 200 includes the WT node (WLAN AG 108) implementing a flow control mechanism at the WT node (WLAN 108) to control a data rate at which data packets of the offloaded DRB are received from the LTE node 102. The flow control mechanism comprises providing the LTE node 102 with the delivery status of each data packet. The delivery status is generated by mapping a PDCP sequence number associated with each data packet to a GTP-U sequence number, wherein the PDCP sequence number is received from the WLAN AP 106a. The PDCP sequence number is identified by the WLAN AP 106a by mapping the feedback received from the UE 104a for a media access control (MAC) sequence number of each data packet transmitted on a WLAN carrier to the UE 104a. The flow control mechanism is described below with reference to FIGS. 9A, 9B, and 10.

As described above at step 204, the LTE QoS parameters and the WLAN QoS parameters that may be used in the method 200 are described below.

An LTE RAT and a WLAN RAT have their own set of QoS parameters for user plane data handling. Even though there are some differences in the approach used by both RATs in terms of access control there are some similarities in terms of traffic classification and traffic prioritization. During radio layer aggregation of WLAN with LTE, any DRB that carries user plane traffic with a given set of required LTE QoS characteristics, if at least some data of the DRB is transmitted using WLAN air interface, does not perform worse than a data radio bearer with similar LTE QoS characteristics whose data traffic is exclusively transmitted using LTE air interface. The principles of the LTE QoS framework remain applicable for EPS bearers offloaded to WLAN if WLAN is aggregated with LTE at the radio layer. If a WT node is added through an Xw interface based on the procedures specified for DC functionality in Release-12 of 3GPP, the added WT node does not understand LTE QoS parameters associated with the offloaded EPS bearer. To have seamless aggregation between LTE and WLAN radio resources for a particular UE, the method 200 defines mapping rules which translate LTE QoS attributes to WLAN QoS attributes such that data packets, if scheduled over a WLAN air-interface, experience similar QoS handling if scheduled over an LTE air-interface. Since an LTE node provides mobility management and manages control plane signaling to a UE, mapping methods/rules must be defined such that an LTE node may control or handle QoS offered by WLAN access per EPS bearer.

The LTE QoS parameters include a QoS class identifier (QCI), allocation and retention priority (ARP), guaranteed bit rate (GBR), maximum bit rate (MBR), access point name (APN)-aggregate maximum bit rate (AMBR) APN-AMBR, UE-AMBR. Every EPS bearer must define QCI and ARP. The QCI is particularly important, because it serves as a reference in determining QoS in terms of priority level for each EPS bearer. In LTE, ARP is basically used for deciding whether a new bearer modification or establishment request is to be accepted, considering the current resource situation. In a DC context, the ARP associated with an EPS bearer may be used for admission control to decide whether to accept or drop the bearer. The ARP is therefore an important QoS attribute used to accept/modify/drop bearers in case of resource limitation. In case of bandwidth (bit rate), GBR and MBR are defined only for GBR type EPS bearers, whereas AMBR (APN-AMBR and UE-AMBR) is defined only in Non-GBR type EPS bearers.

The WLAN QoS may be based on the Institute for Electrical and Electronics Engineers (IEEE) 802.11 specification. Two types of QoS are defined, namely, prioritized QoS and parameterized QoS. Prioritized QoS is a weak requirement that enforces relative priority between traffic streams. Parameterized QoS expresses quantitatively QoS parameters, hence enforcing strict requirement. The IEEE 802.11 specification defines a hybrid coordination function (HCF) which provides two methods of channel access, namely, the HCF controlled channel access (HCCA) for contention free access and enhanced distributed channel access (EDCA) for contention based access. The EDCA mechanism defines four ACs or access categories namely AC_VO (voice), AC_VI (video), AC_BE (best effort) and AC_BK (background) that provide support for the delivery of traffic streams with prioritized QoS. The AC is a marking for a traffic stream including MAC service data units (MSDUs) that have a distinct user priority (UP) associated with the traffic stream. The QoS functionality in the IEEE 802.11 specification supports eight user priority values. The UP may be an integer value from 0 to 7 and are identical to the IEEE 802.1D priority tags. A WLAN AP that supports prioritized QoS functionality based on an enhanced distributed channel access (EDCA) within the MAC understands the meaning of an access category and a user priority associated with MSDU. If the LTE PDCP PDU transported on an Xw at least with certain QCI and ARP associated with a data radio bearer is mapped to an access category and a user priority then the WLAN MAC entity may determine the prioritized QoS for MSDUs (for example, PDCP PDUs). Therefore, an LTE QoS characteristic is required to be visible to the WLAN MAC by translating to a WLAN QoS characteristic so that a WLAN MAC can perform the access category/access class classification according to the IEEE 802.11 specification to support prioritized QoS. Thus, the mapping of LTE QoS to the WLAN QoS is performed at step 204.

The various actions in method 200 may be performed in the order presented, in a different order, or simultaneously. Further, in an embodiment of the present disclosure, some actions listed in FIG. 2 may be omitted.

Figure 3:
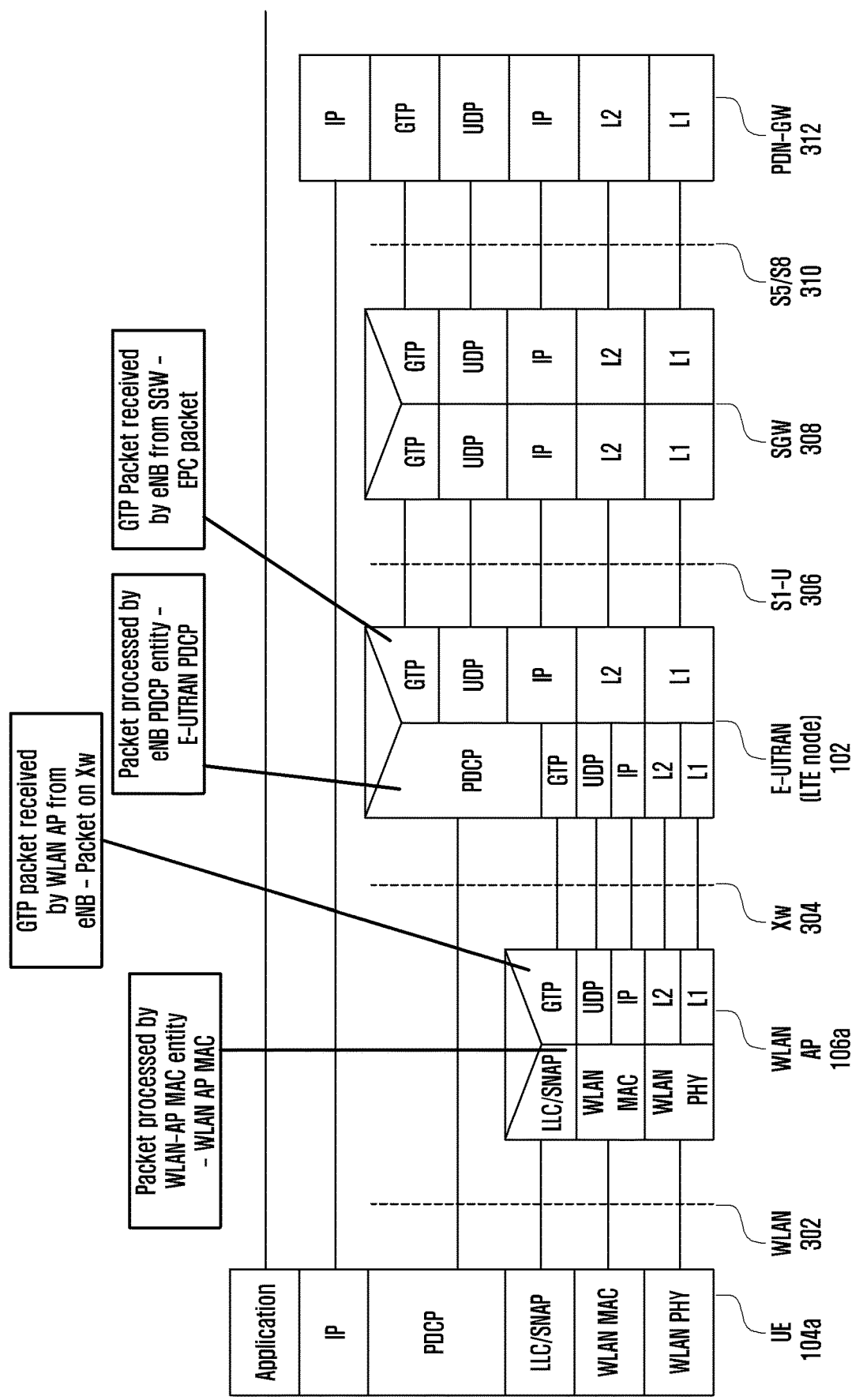
FIG. 3 is a diagram of an end-to-end protocol architecture to support LTE RAT and WLAN RAT aggregation at a radio layer using layer 2 transport for both a collocated scenario and non-collocated scenario, according to an embodiment of the present disclosure.

FIG. 3 is a diagram of an end-to-end protocol architecture to support LTE RAT and WLAN RAT aggregation at a radio layer using layer 2 transport for both a collocated scenario and a non-collocated scenario, according to an embodiment of the present disclosure. The protocol stack in evolved universal terrestrial radio access (E-UTRAN) (LTE node 102) depicts the protocol stack for an S1-U interface 306 between LTE node (LTE eNB) 102 and serving gateway (SGW) 308 and the protocol stack for an Xw interface 304 between LTE node (LTE eNB) 102 and WLAN AP 106a. For a collocated scenario, the protocol stack comprises only the PDCP layer whereas for a non-collocated scenario, it is assumed that a PDCP PDU is delivered over a GTP-U tunnel to the WLAN AP 106a. Therefore, the protocol stack PDCP entity in the E-UTRAN (LTE node 102) and WLAN AP 106a carries a user plane packet (data packet), i.e. the PDCP PDU. The Xw interface 304 which is terminated at the WLAN AP 106a is used for exchanging control plane signaling and transporting a user plane data packet from the LTE node 102 using a GTP-U tunnel. Regardless of whether the Xw is directly terminated in WLAN AP 106a or WLAN AG 108, the user plane packet (data packet) on the Xw 304 looks the same as shown in FIGS. 4A and 4B.

Figure 4A:
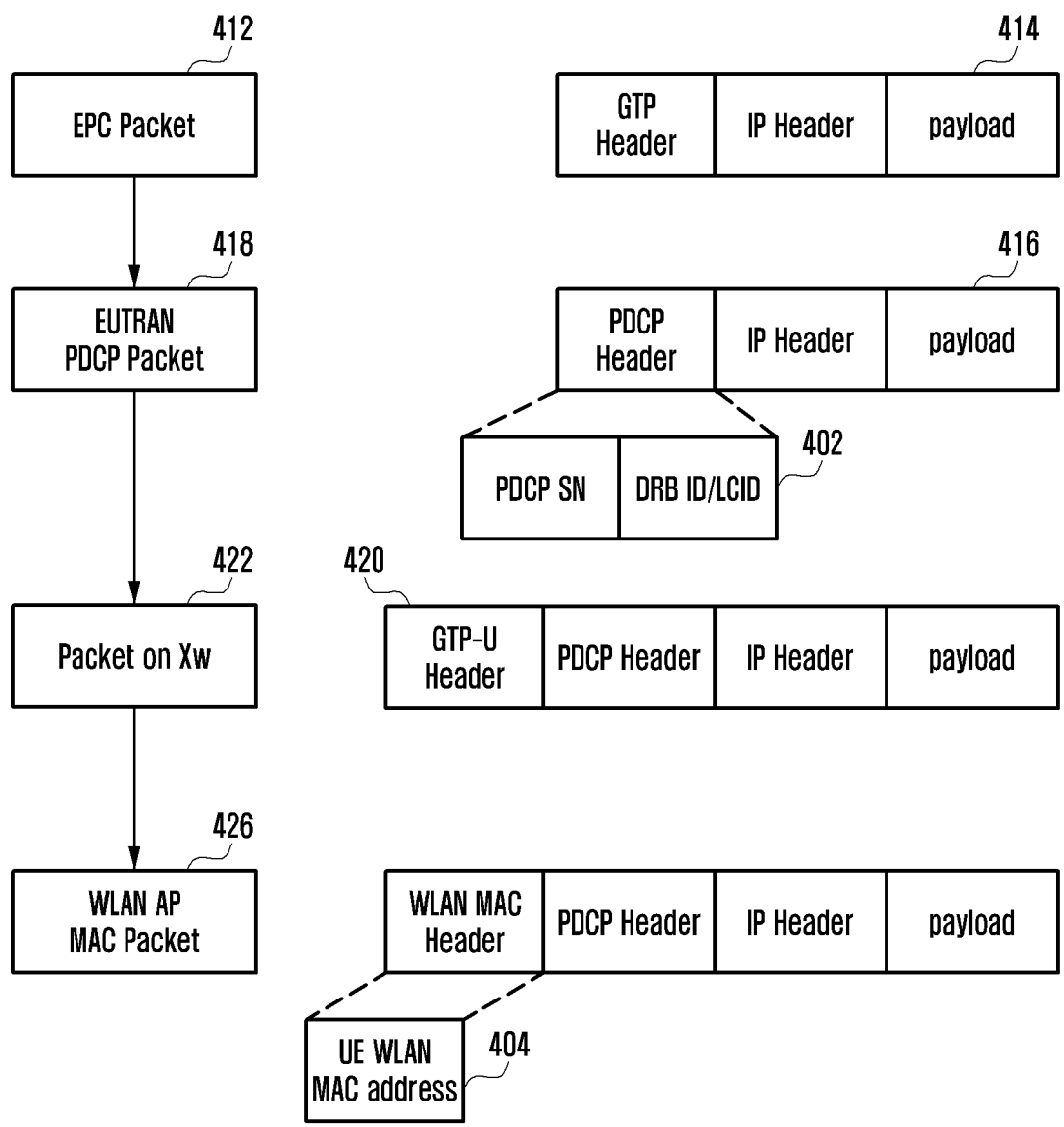
FIGS. 4A and 4B are diagrams of a user plane packet (data packet) structure for PDCP PDUs offloaded to a WLAN using layer 2 transport, according to an embodiment of the present disclosure.
Figure 4B:
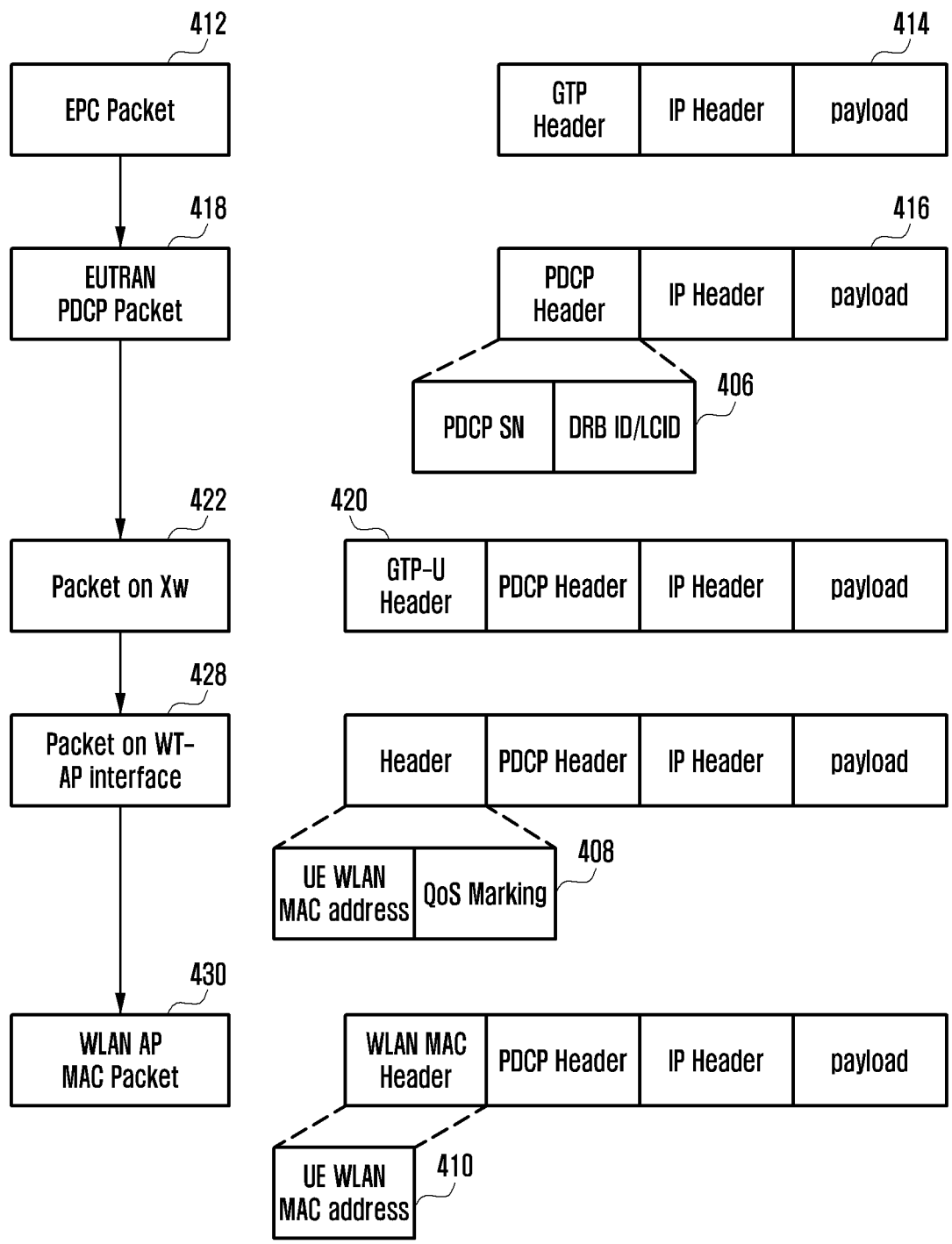

FIGS. 4A and 4B are diagrams of a user plane packet (data packet) structure for PDCP PDUs offloaded to a WLAN using layer 2 transport, according to an embodiment of the present disclosure. If an EPC packet 412 on an S1-U interface 306 is received by an E-UTRAN (LTE node 102) from the SGW 308, the EPC packets contains a GTP header, an IP header and a data payload 414. Since the S1-U interface 306 terminates at the LTE node 102, the LTE node 102 removes the GTP header and adds a PDCP header 402 or PDCP header 406 for transmitting the data packet 416 towards the UE 104a. This is illustrated as an E-UTRAN PDCP packet 418 in FIGS. 4A and 4B, where if it is decided to offload the E-UTRAN PDCP packet on the Xw interface 304 then some modifications to the PDCP header may be required. Such modification to a PDCP header is required to differentiate EPS bearers of the UE 104a, depending on a number of bearers offloaded to the WLAN AP 106a for a particular UE. The GTP-U tunnel for transporting the PDCP PDUs from the LTE node 102 to the WLAN AP 106a for a particular UE is created per EPS bearer. The PDCP entity illustrated in E-UTRAN (LTE node 102) and UE 104a, and the GTP entity illustrated in the E-UTRAN (LTE node 102) and the WLAN AP 106a (refer FIG. 3) are created per EPS bearer. The one-to-one mapping between the EPS bearer and the DRB is maintained. In order to differentiate the PDCP PDUs belonging to different offloaded data radio bearers at the UE side, the PDCP header 402 or PDCP header 406 is extended to include a bearer identity, data radio bearer identity (DRB ID), logical channel identity (LCID) of the EPS bearer. As shown in FIGS. 4A and 4B, the PDCP header 402 or the PDCP header 406 may include a PDCP sequence number (SN) of the PDCP PDU and the bearer ID/DRB ID/LCID associated with the EPS bearer, indicating which PDCP entity processes the PDCP PDU. If the PDCP PDU is transported on the Xw interface 304 through the GTP-U tunnel established for the EPS bearer of a particular UE, the PDCP PDU is appended with a GTP-U header 420. This is illustrated as "Packet on Xw" 422 in FIGS. 4A and 4B, regardless of the Xw interface 304 terminating in WLAN AG 108 or WLAN AP 106a.

Since the Xw interface 304 terminates in WT/WLAN AP further user plane processing involves appending the WLAN MAC header 404 to the PDCP PDU 418 as shown in FIG. 4A to form the WLAN MAC SDU. This is illustrated as "WLAN AP MAC Packet" 426 in FIG. 4A where the Xw interface 304 terminates in WLAN AP 106a. The MAC SDU containing the WLAN MAC header 404 comprises the UE MAC address as the destination address and the WLAN AP 106a MAC address as the source address. Since the GTP-U tunnel between the LTE node 102 and WT node is maintained per bearer per UE, the QoS characteristics of the GTP-U tunnel may be associated with the LTE QoS characteristics of the EPS bearer. However, the WT node (WLAN AP 106a) cannot understand the LTE QoS characteristics of the GTP-U tunnel and, therefore, translation of the LTE QoS characteristics to a WLAN QoS characteristics is required. Translation of the LTE QoS characteristics to a WLAN QoS characteristics is possible by either maintaining a mapping table at the LTE node 102 or at the WT node (WLAN AP 106a or WLAN AG 108), which translates the LTE QCI and priority level attributes to WLAN QoS parameters and user priority attributes. Thus, if the PDCP PDUs of a particular GTP-U tunnel of a particular UE is delivered to a WLAN MAC then the PDCP PDU is buffered (queued) in an appropriate AC queue associated with the WLAN QoS parameters and user priority such that the AC queue is maintained per UE. If the Xw interface 304 terminates in a WT node (WLAN AG 108) then, depending on the local interface between the WLAN AG 108 and WLAN AP 106a, an appropriate header 408 (i.e., WLAN QoS header) is appended to the PDCP PDU as shown in FIG. 4B. This is illustrated as "Packet on WT-AP Interface" 428 in FIG. 4B. On the local interface between the WLAN AG 108 and WLAN AP 106a, it may not be possible to maintain the bearer/tunnel concept, because layer 2 transport is used to forward the PDCP PDUs of one or more bearers of one or more UEs from the WLAN AG 108 to the WLAN AP 106a. In order to maintain LTE QoS characteristics of the GTP-U tunnel on Xw interface 304 for the data packets it is transporting, each PDCP PDU may carry a QoS marking associated with the QoS characteristic of that particular bearer/GTP-U tunnel if transported on the local interface between WLAN AG 108 and WLAN AP 106a. For example, if the local interface between the WLAN AG 108 and the WLAN AP 106a is an Ethernet then an Ethernet header (header 408 or WLAN QoS header) is appended to the PDCP PDU such that the Ethernet header 408 which may include at least a destination address in the form of a UE WLAN MAC address to identify a particular UE and a QoS marking field associated with a QoS characteristic of that particular bearer/GTP-U tunnel as shown in the FIG. 4B. For example, a QoS marking in header 408, which is added to the PDCP PDU, may be similar to a QoS marking which is used in an 802.1Q header. The 802.1Q header contains a 3 bit priority code point (PCP) field which may be used for a QoS marking. Depending on the local interface, an appropriate header (which is the WLAN QoS header) 408 containing the UE WLAN MAC address to identify a particular UE and a QoS marking field may be appended to the PDCP PDU for maintaining the QoS characteristics associated with the offloaded bearer. The process of adding a header that includes a QoS marking if the PDCP PDU is transported on the local interface between WLAN AG 108 and WLAN AP 106a may be referred to as a per packet marking. Since the local interface terminates in WLAN AP 106a further user plane processing involves appending the WLAN MAC header 410 to the PDCP PDU, as shown in FIG. 4B, to form a WLAN MAC SDU. This is illustrated as "WLAN AP MAC Packet" 430 in FIG. 4B where the local interface terminates in WLAN AP 106a.

Figure 5:
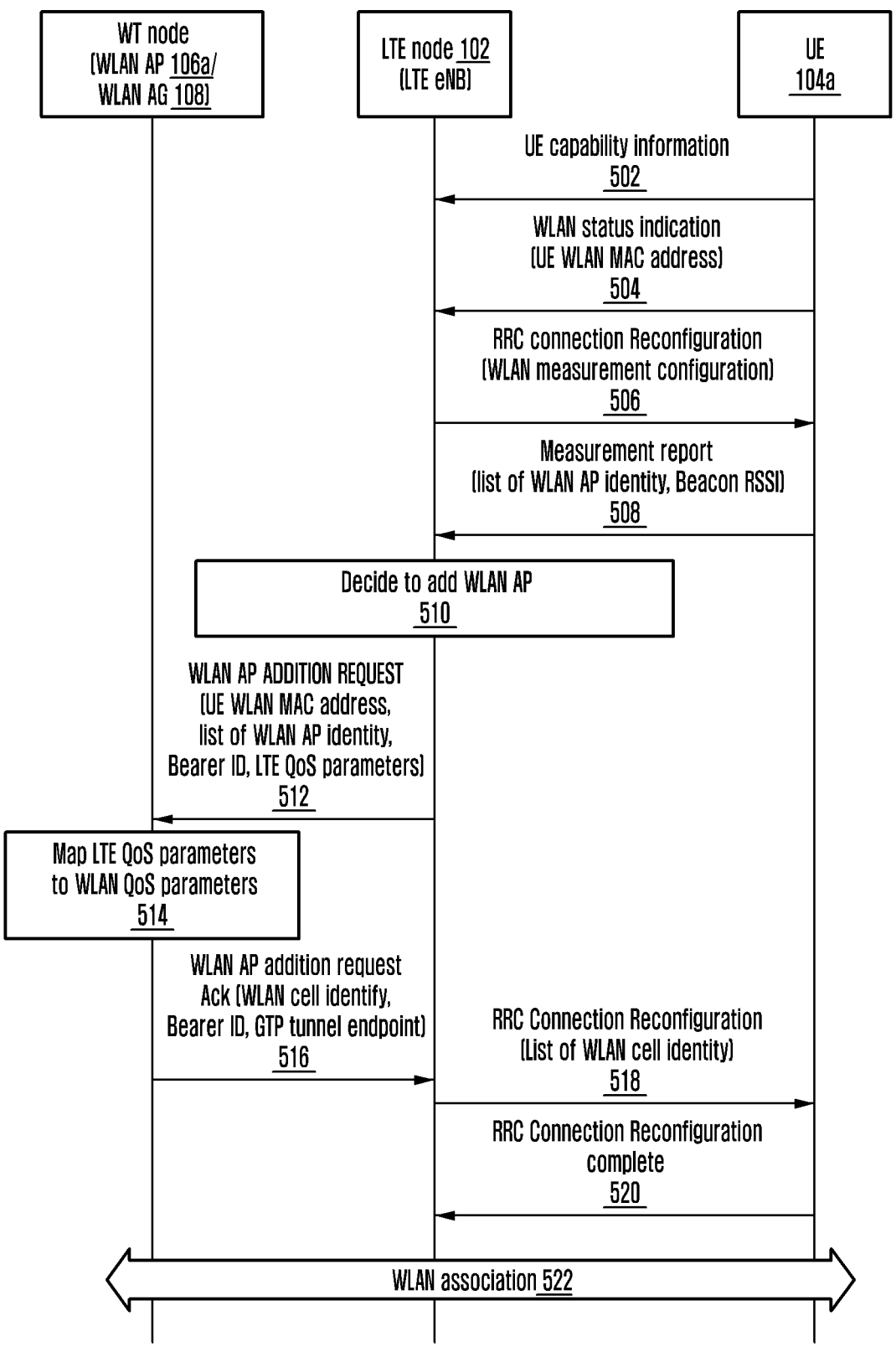
FIG. 5 is a sequence diagram for adding a WT node conforming to a DC framework, according to an embodiment of the present disclosure.

FIG. 5 is a sequence diagram for adding a WT node conforming to DC framework, translation of the LTE QoS characteristics to a WLAN QoS characteristics. In FIG. 5, for the offloaded DRBs, the mapping of LTE QoS parameters to WLAN QoS parameters is performed at a WT node. During the WT node (WLAN AP 106a or WLAN AG 108) addition procedure, there is a preparation phase between the LTE node (LTE eNB) 102 and the WT node (WLAN AP 106a or WLAN AG 108) in which the WT node (WLAN AP 106a or WLAN AG 108) is informed of at least one new UE (e.g. UE 104a) arriving in the near future (identified by UE WLAN MAC address) and establishing a GTP-U tunnel between the LTE node 102 and the WT node (WLAN AP 106a or WLAN AG 108) using control signaling on the Xw interface 304.

Further, the LTE node 102 may be configured to receive, at step 502, UE capability information shared by the UE 104a, indicating support of LTE RAT-WLAN RAT radio layer aggregation during initial setup or during attach procedure or as requested by the LTE node 102. The LTE node 102 may be configured to receive, at step 504, the UE WLAN MAC address shared by the UE 104a through a WLAN status indication or any other RRC message. The LTE node 102 may require the UE WLAN MAC address for authentication with the WLAN. Based on load or signal condition, the LTE node 102 may configure the UE 104a with WLAN measurements through an RRC connection reconfiguration message, at step 506, which includes the WLAN channels to be scanned. The LTE node 102 may also share a list of WLAN APs and reporting criteria which may be used by the UE 104a as a trigger condition. Further, the UE 104a may be configured to start scanning for WLAN carriers according to a WLAN measurement configuration. After the UE 104a detects an event as configured by the LTE node 102, the LTE node 102 may be configured to receive, at step 508, a measurement report from the UE 104a with the list of WLAN APs detected along with a signal strength associated with each detected WLAN AP. After receiving the measurement report from the UE 104a, the LTE node 102 may be configured to evaluate the measurement report and determine to add a WT node (e.g. WLAN AP 106a) reported by the UE 104a. The LTE QoS parameters associated with the DRB which is intended to be offloaded to the WLAN AP 106a includes at least the QCI value of the bearer, ARP of the bearer, some GBR QoS parameters like packet delay budget, packet error rate, and so on. Further, the LTE node 102 may be configured to evaluate the measurement report and determine to add, at step 510, the WLAN AP 106a reported by UE 104a.

After determining to add the WLAN AP 106a, the LTE node 102 (also referred to as a Master eNB) may be configured to add a WT node (e.g. WLAN AP 106a) and send, at step 512, a "WLAN AP ADDITION REQUEST" message to the WT node (e.g. WLAN AP 106a) over the Xw interface 304. The "WLAN AP ADDITION REQUEST" message includes at least a list of bearer IDs, also referred as DRB IDs or E-RABs, the UE WLAN MAC address, and the list of detected APs which are expected to be in the vicinity of the UE. As illustrated in FIG. 5, in addition to the list of bearer IDs (i.e., E-RABs), the "WLAN AP ADDITION REQUEST" message includes the LTE QoS parameters associated with the data radio bearer (E-RAB). In FIG. 5, in addition to the list of bearer IDs (i.e., E-RABs), which are the DRBs to be offloaded, the "WLAN AP ADDITION REQUEST" message includes the LTE QoS parameters associated with the DRBs. If the LTE node 102 sends the "WLAN AP ADDITION REQUEST" message, the LTE node 102 may be configured to start a timer TDCprep, and if the WT node (e.g. WLAN AP 106a or WLAN AG 108) is not able to respond within the time set by the timer, the LTE node 102 may determine the WT node addition procedure to be unsuccessful.

Further, the WT node (WLAN AP 106a) may be configured to receive, at step 512, the "WLAN AP ADDITION REQUEST" message comprising the list of DRB IDs (i.e. E-RABs) and the associated LTE QoS parameters like QCI and ARP. The WT node (WLAN AP 106a or WLAN 108) may be configured to translate or map, at step 514, the received LTE QoS parameters to the WLAN QoS parameters using a mapping table derived per one of the mapping methods proposed and described below with reference to FIG. 6. The WT node (WLAN AP 106a or WLAN 108) performs the mapping of the LTE QoS parameters to the WLAN QoS parameters by translating parameters like QCI and priority level to the AC and user priority which is understood by the WLAN MAC for packet scheduling for each data packet transported by the offloaded E-RAB. Mapping of LTE QoS parameters to WLAN QoS parameters are described below with reference to FIG. 6.

The WT node (WLAN AP 106a or WLAN AG 108) may be further configured to map the LTE QoS parameters associated with a particular bearer, such as packet delay budget and packet error rate, to derive WLAN parameterized QoS such contention window minimum (CWmin), contention window maximum (CWmax), transmission opportunity (TxOP), arbitration inter-frame spacing (AIFS) to ensure that QoS requirements may be met. After the WT node accepts the "WLAN AP ADDITION REQUEST," the WT node (WLAN AP 106 or WLAN AG 108) may be configured to send, at step 516, a "WLAN AP ADDITION REQUEST ACKNOWLEDGEMENT (ACK)" message to the LTE node 102 and include the result for all requested offloaded bearer IDs such as E-RABs as described below.

A list of bearer IDs (i.e., E-RABs) which are successfully established are included in the E-RABs admitted list information element (IE).

WLAN QoS parameters associated with a list of bearer IDs (i.e., E-RABs) in the E-RAB admitted list IE if the successfully established E-RABs correspond to UL DRBs.

A list of bearer IDs (i.e., E-RABs) which failed to be established is included in the E-RABs not admitted list IE.

WLAN AP cell identity (i.e., service set identifier (SSID) or basic service set identifier (BSSID)) and GTP tunnel end-point ID (TEID).

The WT node may determine not to admit one or more DRBs from the list of E-RABs received in the "WLAN AP ADDITION REQUEST" message based on the ARP value associated with the E-RAB. Such E-RABs which are not admitted by the WT/WLAN AP are included in the E-RABs not admitted list IE.

The WT node may be configured to send a "WLAN ADDITION REQUEST" rejection in the case it is determined that it may not be able to meet the QoS requirements for a particular UE due to a load situation. However, if the WT node receives the "WLAN AP ADDITION REQUEST" message containing LTE QoS parameters which contain a QCI IE associated with a bearer indicating that the bearer is a GBR bearer, and does not contain the GBR QoS IE, then the WT node determines that the establishment of the corresponding bearer ID (E-RAB) failed.

However, after receiving an "ADDITION REQUEST ACK" message from the WT node, the LTE node 102 may be configured to configure the UE 104a with WLAN resources by sending, at step 518, an RRC reconfiguration message by adding the identity of the WT node. The RRC message, at step 518, is sent to the UE 104a and may include the WLAN QoS parameters associated with the offloaded DRB, if the DRB is a UL DRB. In response, the LTE node 102 may be configured to receive, at step 520, an "RRC Connection Reconfiguration complete" message from the UE 104a, after the UE 104a applies the WLAN configuration. Further, the WT node may be configured to receive communication from the UE 104a to perform, at step 522, the association procedure as indicated in the WLAN configuration.

Figure 6:
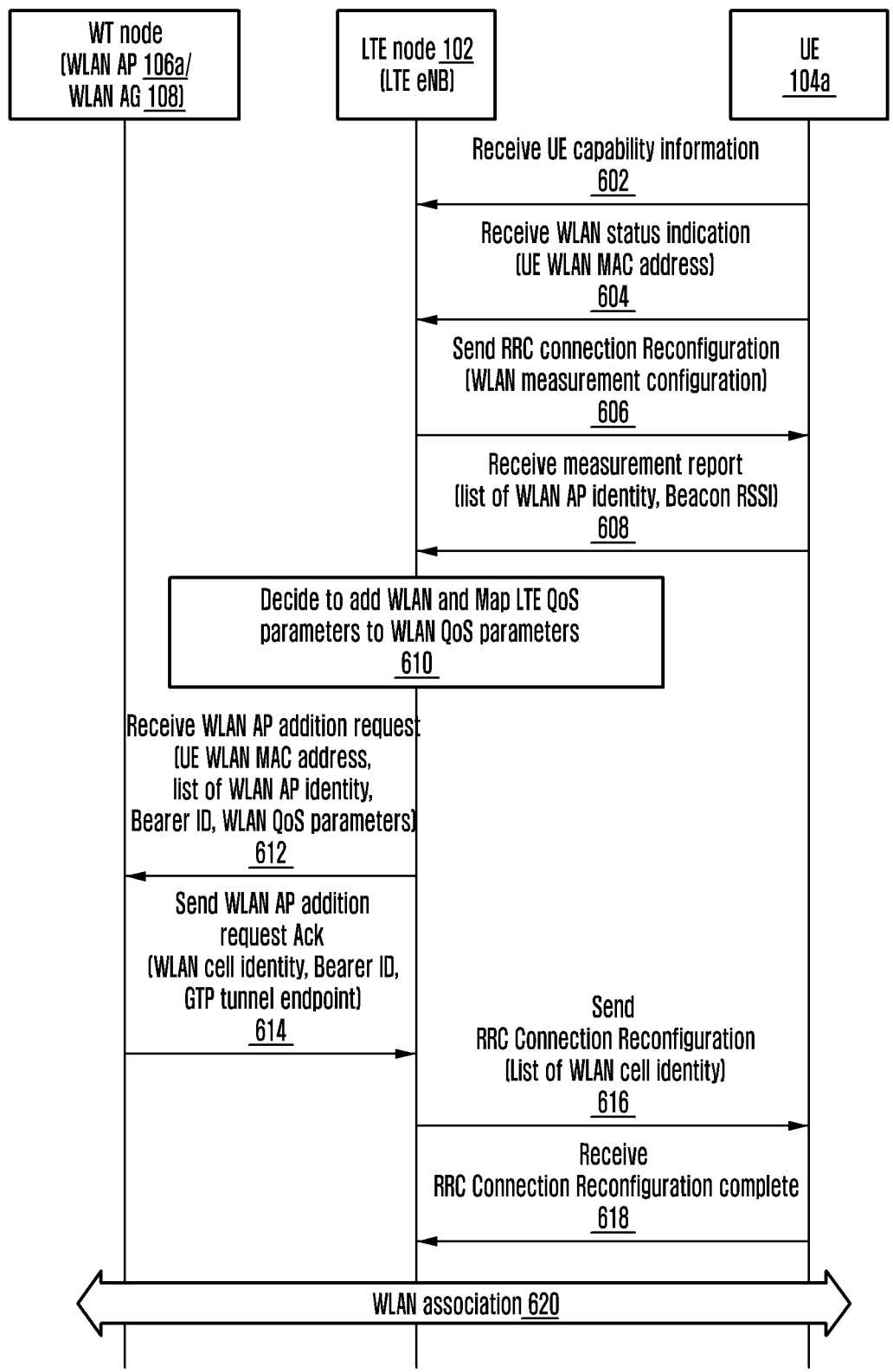
FIG. 6 is a sequence diagram for adding a WT node to offload DRBs, with mapping of LTE QoS parameters of the offloaded DRB to WLAN QoS parameters performed at an LTE node, according to an embodiment of the present disclosure.

FIG. 6 is a sequence diagram for adding a WT node to offload DRBs, with mapping of LTE QoS parameters of the offloaded DRB to WLAN QoS parameters performed at an LTE node, according to an embodiment of the present disclosure. The steps of FIG. 6 are the same as the steps of FIG. 5, except step 610 in FIG. 6 in different than step 510 of FIG. 5, where the LTE node 102 may be configured to determine to add a WT node (WLAN AP 106a or WLAN AG 108) and map LTE QoS parameters to WLAN QoS parameters at the LTE node, at step 610. The LTE node 102 performs the mapping of LTE QoS parameters to WLAN QoS parameters by translating parameters like QCI and priority level to the AC and user priority, which is understood by WLAN MAC for packet scheduling for each data packet transported by the offloaded E-RAB. Thus, step 514 performed by the WT node in FIG. 5 is not required to be performed by the WT node in FIG. 6, because the mapped WLAN QoS parameters are sent to the WT node by the LTE node 102 in the "WLAN ADDITION REQUEST" message, at step 612. The steps in FIG. 6 that are the same as the steps in FIG. 5 are not repeated for brevity. The RRC message, at step 616, sent to the UE 104a may also include the WLAN QoS parameters associated with the offloaded DRB if the DRB is a UL DRB.

Mapping or translating of LTE QoS parameters to WLAN QoS parameters for an offloaded DRB to maintain QoS associated with the DRB if data packets are scheduled through the WLAN RAT are described below. Any of the embodiments for mapping may be used by the method 200 in FIG. 2 and performed at step 514 in FIG. 5 or step 610 in FIG. 6.

In an embodiment of the present disclosure, a first mapping method maps the LTE QCI to the WLAN AC category based on prioritized QoS. The mapping between the LTE QCI and the WLAN AC category may be done based on a priority level. For example, an LTE QCI 5 having the highest priority level of 1 is mapped to a WLAN AC_VO having the highest user priority 7 (i.e., UP 7). LTE QCI 1 having priority level 2 is mapped to WLAN AC_VO having user priority 6 (i.e., UP 6). An example of mapping the LTE QCI to the WLAN AC based on a priority level is shown below in Table 1 and may be implemented either at the LTE node 102 or a WT node (WLAN AP 106a or WLAN AG 108). The actual mapping table between LTE QCI and WLAN AC may be based on a wireless network operator policy. EPS bearers associated with QCI 65, 66, 69, and 70 may or may not be offloaded to a WLAN depending on an operator policy, because these bearers are related to mission critical services.

TABLE 1

| QCI | Priority Level | Packet Delay Budget | Packet Error Loss Rate | Access class | WLAN User priority | Designation |
|---|---|---|---|---|---|---|
| 1 | 2 | 100 ms | $10^{-2}$ | AC_V0 | 6 | Voice |
| 2 | 4 | 150 ms | $10^{-3}$ | AC_V1 | 4 | Video |

TABLE 1-continued

| QCI | Priority Level | Packet Delay Budget | Packet Error Loss Rate | Access class | WLAN User priority | Designation |
|---|---|---|---|---|---|---|
| 3 | 3 | 50 ms | $10^{-3}$ | AC_V1 | 5 | Video |
| 4 | 5 | 300 ms | $10^{-6}$ | AC_BE | 3 | Best Effort |
| 65 | 0.7 | 75 ms | $10^{-2}$ | AC_V0 | 7 | Voice |
| 66 | 2 | 100 ms | $10^{-2}$ | AC_V0 | 6 or 7 | Voice |
| 5 | 1 | 100 ms | $10^{-6}$ | AC_V0 | 7 | Voice |
| 6 | 6 | 300 ms | $10^{-6}$ | AC_BK | 2 | Background |
| 7 | 7 | 100 ms | $10^{-3}$ | AC_BK | 1 | Background |
| 8 | 8 | 300 ms | $10^{-6}$ | AC_BE | 0 | Best Effort |
| 9 | 9 | | | AC_BE | 0 | Best Effort |
| 69 | 0.5 | 60 ms | $10^{-6}$ | AC_V0 | 7 | Voice |
| 70 | 5.5 | 200 ms | $10-6$ | AC_BK or AC_BE | 2 or 3 | Best efforts or Background |

In an embodiment of the present disclosure, a second mapping method maps the LTE QCI and the WLAN AC based on type of service. The LTE QCI to WLAN AC mapping may be performed based on type of service. For example, conversational voice may be mapped to WLAN AC which supports voice, such as mapping QCI 1 to AC_V0. Similar kinds of mappings may be performed for other services like video, and background and video. The LTE priority level associated with the QCI is mapped as per current user priority (UP) associated with an AC in WLAN for all services. Services like interne multimedia subsystem (IMS) signaling, mission critical push to talk (PTT) services etc. may be mapped to any of the ACs and UPs based on a wireless network operator policy. An example of a mapping table of the LTE QCI to WLAN AC based on type of service is shown below in Table 2. Rules for the mapping may be as described below:

1. QCI 1, and 2 used for conversation may be mapped to WLAN AC_V0 and UP may be 6;
2. QCI 3, and 4 used for streaming may be mapped to WLAN AC_V1 and UP may be 4/5. QCI 5 used for signaling may be mapped to WLAN AC_V0 with a designation of network controlled (NC) and UP may be 7. Alternatively, QCI 5 may be mapped to AC_BE, AC_BK, or AC_V1, and the priority may be set accordingly;
3. QCI 6, 7, and 8 used for interactive traffic may be mapped to AC_BE and UP may be 3/0;
4. QCI 9 used for background may be mapped to AC_BK and UP may be 2/1;
5. QCI 65, and 66 used for PTT voice data can be mapped to AC_V0 with UP 6; and
6. QCI 69, and 70 used for PTT signaling data may be mapped to AC_V0 with UP 7/6 or AC_BE, or AC_BK with UP 0/1/2/3.

TABLE 2

| QCI | Priority Level | Access class | WLAN User priority | Example Services | Comment |
|---|---|---|---|---|---|
| 1 | 2 | AC_V0 | 6 | voice | |
| 2 | 4 | AC_V0 | 6 | voice | It can be mapped to AC_V1 also with UP 5 |
| 3 | 3 | AC_V1 | 4 | video | |
| 4 | 5 | AC_V1 | 5 | Video | |
| 65 | 0.7 | AC_V0 | 6 | voice | |
| 66 | 2 | AC_V0/V1 | 6/5 | voice/video | |

TABLE 2-continued

| QCI | Priority Level | Access class | WLAN User priority | Example Services | Comment |
|---|---|---|---|---|---|
| 5 | 1 | AC_V0 | 7 | — | Alternatively it can be mapped to AC_BE or AC_BK or AC_V1 and set the priority accordingly |
| 6 | 6 | AC_BE | 3 | Best Effort | |
| 7 | 7 | AC_BE | 3/0 | Best effort | |
| 8 | 8 | AC_BE | 3/0 | Best effort | |
| 9 | 9 | AC_BK | 2/1 | Background | |
| 69 | 0.5 | AC_V0 | 7/6 | Voice signalling | |
| 70 | 5.5 | Note 1 | — | — | |

Note 1:
QCI 69, 70 is for push to talk signaling data and can be mapped to AC_V0 with UP 7/6 or AC_BE or AC_BK with UP 0/1/2/3

In an embodiment of the present disclosure, a third mapping method maps the LTE QCI and WLAN AC for only GBR type bearers. If a wireless operator network supports LTE RAT and WLAN RAT aggregation at a radio layer, only a GBR type of bearer may be offloaded to a WLAN. An EPS bearer with a resource type of GBR is associated with a guaranteed bandwidth. Only a dedicated bearer may be a GBR bearer type. A default EPS bearer may not be a GBR bearer type. Typically, the QCI of GBR type bearer may range from 1 to 4. Therefore there is no need to map each and every LTE QCI to WLAN AC. Mapping only applies to bearers having an QCI associated with a GBR bearer type. An example of a mapping table of the LTE QCI to WLAN AC based on GBR bearer type is shown below in Table 3. For example, QCI 2 may be used for voice or video. The same may be the case for WLAN AC.

TABLE 3

| QCI | Resource Type | Priority level | Access class | User priority | Example Services |
|---|---|---|---|---|---|
| 1 | GBR | 2 | AC_V0 | 6 | Voice |
| 2 | | 4 | AC_V1 | 4 | Video |
| 3 | | 3 | AC_V1 | 5 | Video |
| 4 | | 5 | AC_BE/AC_BK | 3 | Background/best effort |

In an embodiment of the present disclosure, a fourth mapping method maps the LTE QCI and WLAN AC for only a non-GBR type of bearer. An EPS bearer with a resource type of non-GBR is associated with a non-guaranteed bandwidth. This indicates that the non-GBR bearer type is a best effort type bearer. A default EPS bearer is always a non-GBR bearer type, whereas a dedicated EPS bearer may be either a GBR bearer type or non-GBR bearer type. Typically the QCI of a non-GBR bearer type may range from 5 to 9. In the fourth method of mapping, the LTE QCI to WLAN AC mapping is only applicable for QCI which are associated with a non-GBR bearer type. The WLAN AC and user priority may be mapped based on LTE priority level and associated service type. An example of a mapping table of the LTE QCI to WLAN AC based on a non-GBR bearer type is shown below in Table 4.

TABLE 4

| QCI | Resource Type | Priority level | Access class | User priority | Example Services |
|---|---|---|---|---|---|
| 5 | Non-GBR | 1 | AC_V0 | 7 | Voice Signalling |
| 6 | | 6 | AC_V1 | 5 | Video (Buffered Streaming) TCP-based (e.g., www, e-mail, chat, ftp, p2p file sharing, progressive video, etc.) |
| 7 | | 1 | AC_V0 | 6 | Voice, Video (Live Streaming), Interactive Gaming |
| 8 | | 8 | AC_BK | 2 | Video (Buffered Streaming) TCP-based (e.g., www, e-mail, chat, ftp, p2p file sharing, progressive video, etc.) |
| 9 | | 9 | AC_BE | 3 | |

In an embodiment of the present disclosure, a firth mapping method dynamically maps the LTE QCI and the WLAN AC. This mapping is dynamic and may keep changing based on load and other factors like radio conditions and so on experienced at a WT node (WLAN AG/WLAN AP). The LTE eNB, or any other entity of the wireless communication system 100, may maintain a mapping table and update the same based on the LTE eNB and WLAN negotiation on the Xw interface. It may operate as described below.
1. An LTE eNB determines to add a WLAN AP and, for an offloaded bearer, determines an AC and a UP based on any of first to fourth mapping methods described above. Further, the LTE eNB makes a suggestion to a WT node (WLAN AG/WLAN AP) over the Xw interface.
2. The WT node (WLAN AG/WLAN AP) may respond with an AC and a priority that it can support for the LTE eNB suggestion. This is important in case multiple bearers are offloaded to a WLAN.
3. Based on the negotiation, the LTE eNB maintains the QCI to WLAN AC mapping and may use it for future reference for bearers it offloads to a WLAN. The next time for the same QCI and/or bearer type, the LTE eNB may directly choose the WLAN AC and UP for negotiation over the Xw interface with the WT node (WLAN AG/WLAN AP).
4. The WT node (WLAN AG/WLAN AP) continues informing the LTE eNB if it supports the same suggestion based on load and other factors like radio conditions etc.

In an embodiment of the present disclosure, a sixth mapping method maps an LTE QoS parameter to a WLAN parameterized QoS. The EPS bearer is associated with a QCI value such that each QCI is expressed in terms of a priority level, a packet delay budget, and a packet error loss rate. The HCCA functionality in the IEEE 802.11 specification supports parameterized QoS such that it uses a centralized coordinator, called a hybrid coordinator (HC), which is collocated with the WLAN AP and uses the HC's higher priority of access to the wireless medium to initiate frame exchange sequences and to allocate TxOPs to the WLAP AP and WLAN UEs in order to provide a limited-duration of a contention-free transfer of data. It is possible to derive the setting of the values for parameterized WLAN QoS parameters like CWmin, CWmax, TxOp, AIFS from the corresponding QCI's packet delay budget and packet error loss rate, respectively. The WLAN, while deciding the value of these parameters, may consider the attributes of LTE QCI and set the parameterized WLAN QoS parameters for different traffic streams or service accordingly, or within a different AC to meet strict QoS requirements. The LTE ARP value may also be considered as an optional attribute to derive parameterized WLAN QoS parameters. The setting of the values of all other WLAN QoS is based on an operator policy.

In an embodiment of the present disclosure, a seventh mapping method maps LTE QoS parameters to WLAN parameters by using the ARP attribute at the WLAN. There are 0-15 ARP priorities defined in LTE. If an eNB is offloading any bearer or service to a WLAN it must maintain the QoS associated with the bearer, so that the WLAN can take any modification/drop decision later. The ARP attribute associated with the bearer may also be used by the WLAN to determine the service modification or, in simple terms, whether to accept or reject the bearer if a WT node (WLAN AG/WLAN AP) receives a "WLAN AP ADDITION REQUEST" message. The guidelines described below may be applicable for the admission control at the WT/WLAN AP of the bearer:
1. If EPS bearer QoS parameters are mapped to WLAN QoS parameters, the pre-emption capability and the pre-emption vulnerability information of the EPS bearer, i.e. ARP attribute, is not ignored by the WT/WLAN AP even though the ARP is not mapped to any WLAN QoS parameter.
2. The LTE eNB may translate the ARP values (0-15) associated with a bearer and provide to the WLAN in terms of high priority (H), medium priority (M), and lowest priority (L), which can be set according to operator requirements to ensure proper admission control of bearers. The minimum value of H is 1. The minimum value of M is H+1, and the minimum value of L is M+1. This admission control priority associated with the bearer should not be confused with the UP of AC to which the bearer is mapped.

In an embodiment of the present disclosure, an eighth mapping method maps the LTE QCIs and the WLAN AC based on GBR and non-GBR service. In this case, GBR services may be mapped to the WLAN AC which supports voice and video. Non-GBR services may be mapped to an AC which supports background and best effort. The user priority range is described, and it may be determined by any network (NW) entity (e.g., LTE or WLAN). The AC may be reversed as well, where GBR may support background (BK) and best effort (BE), while non-GBR supports voice and video.

Figure 7A:
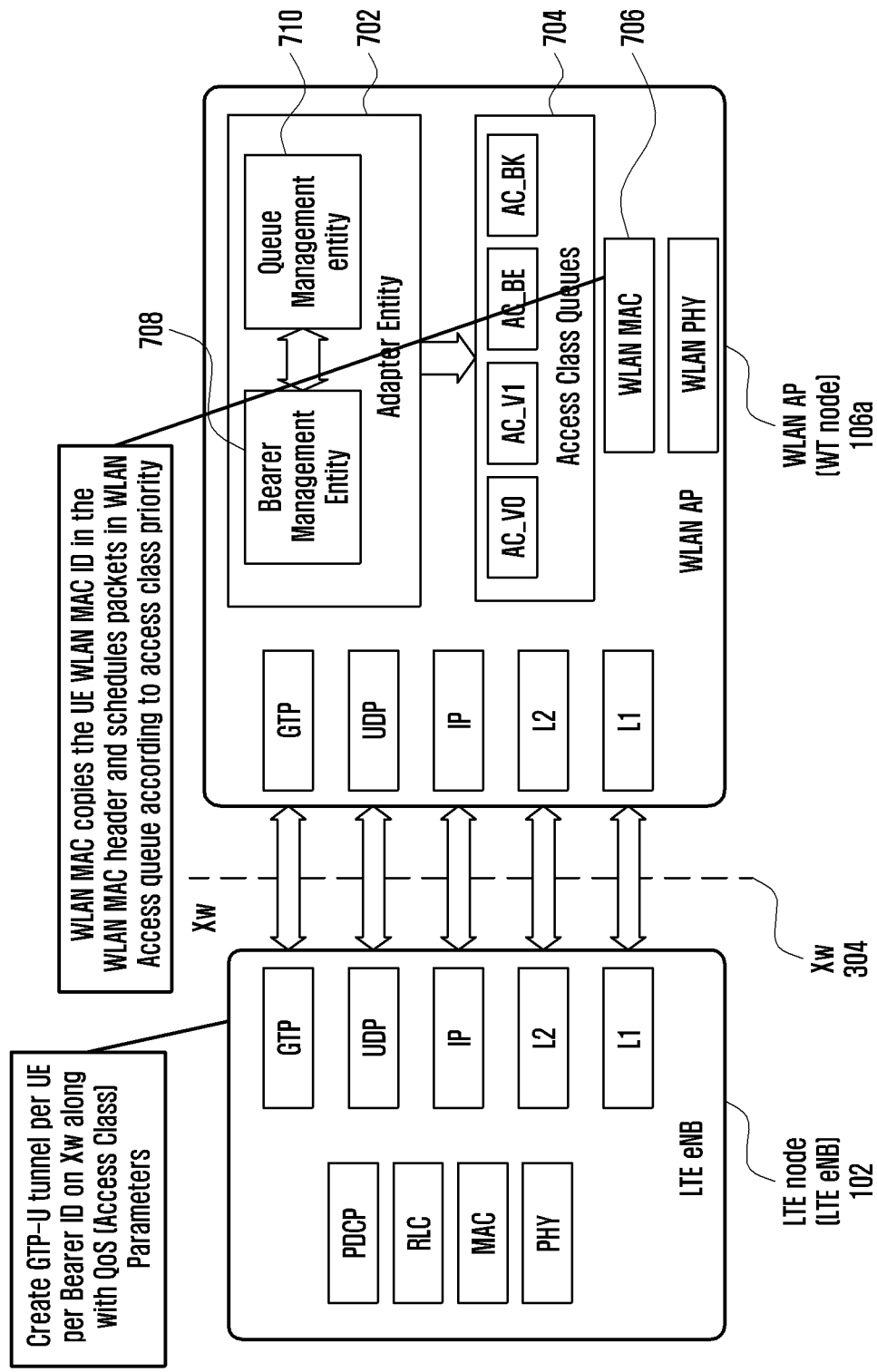
FIGS. 7A and 7B are diagrams of a plurality of entities of an LTE node and a WLAN access point (AP) if an interface between an LTE RAT and a WLAN RAT is terminated in the WLAN AP, according to an embodiment of the present disclosure.
Figure 7B:
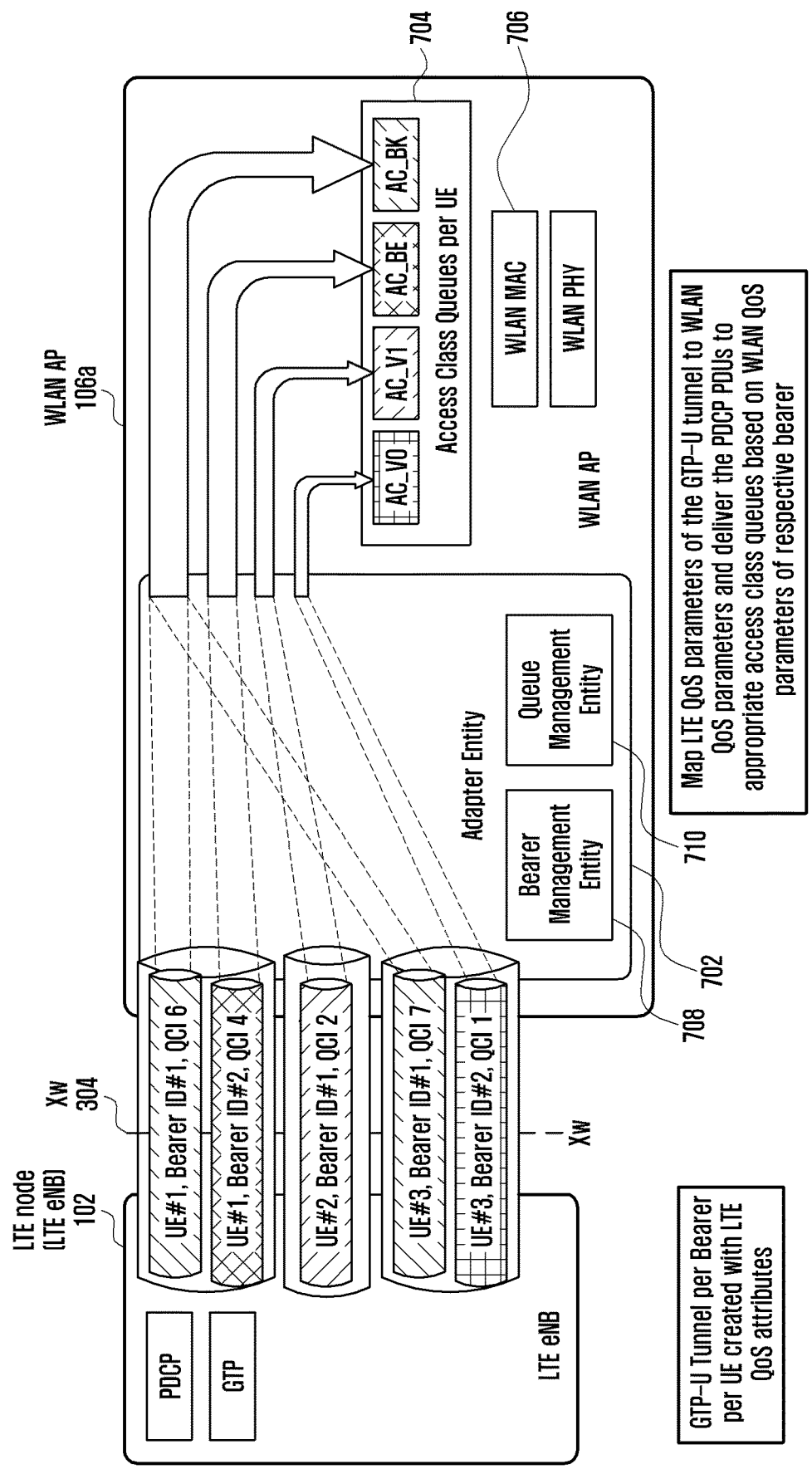

FIGS. 7A and 7B are diagrams of plurality of entities of an LTE node and a WLAN AP if an interface between an LTE RAT and a WLAN RAT is terminated in the WLAN AP, according to an embodiment of the present disclosure. For the LTE RAT and the WLAN RAT aggregation at the radio layer, the LTE node 102 may be configured to create a GTP-U tunnel per UE per bearer according to an Xw procedure described above with reference to FIGS. 5 and 6 by exchanging control plane signaling with the WT node (WLAN AP 106a). During the creation of the GTP-U tunnel for transporting the PDCP PDUs of the offloaded EPS bearer towards the WT node (WLAN AP 106a), the QoS characteristics of the GTP-U tunnel are determined. As described above with reference to FIG. 5, the GTP-U tunnel per UE per bearer is created according to LTE QoS parameters such as QCI, ARP and the like. An adapter entity 702 in the WLAN AP 106a may be configured to map LTE QoS parameters to WLAN QoS parameters according to one of the first to eighth mapping methods described with reference to FIG. 6. Alternatively, if mapping is performed at the LTE node 102 then the GTP-U tunnel per UE per bearer is created according to WLAN QoS parameters such as AC, UP, and the like. In FIG. 7A, the LTE node 102 may be configured to map LTE QoS parameters to WLAN QoS parameters. In FIG. 7B, the WLAN AP 106a may be configured to map LTE QoS parameters to WLAN QoS parameters. The adapter entity 702 also manages the flow control such that no more than half of the PDCP sequence number (SN) space is employed on the Xw interface 304 per GTP-U tunnel. Further, the adapter entity 702 may be configured to provide feedback to the LTE node 102 per GTP-U tunnel about the successfully delivered PDCP PDUs and the PDCP PDUs which are not delivered through the WLAN air-interface. If multiple bearers are offloaded to the WLAN AP 106a then multiple GTP-U tunnels on the Xw interface 304, which is handled by a bearer management entity 708 within the adapter entity 702, may result. The data packets (PDCP PDUs) transported on the respective GTP-U tunnels must be buffered at the WLAN AP 106a according to WLAN QoS characteristics identified according to the WLAN AC and UP parameters associated with the bearer (GTP-U tunnel) after translation or mapping. A queue management entity 710 in the adapter entity 702 delivers the data packets (PDCP PDUs) of a particular UE belonging to a particular bearer (GTP-U tunnel) to the respective AC queues 704 created per UE according to the WLAN AC and UP parameters associated with the bearer. The AC queues 704 in the WLAN AP 106a are per UE, therefore the respective AC queues may comprise data packets of different bearers (DRBs) of the same UE having the same WLAN QoS parameters. Even though the PDCP PDUs of different bearers having the same WLAN QoS parameters associated with a particular UE are buffered in the same AC queue, the bearer ID/DRB ID/LCID field in the PDCP header differentiates the PDCP PDUs. A WLAN MAC entity 706 may be configured to use the bearer ID/DRB ID/LCID field in the PDCP header while maintaining the mapping between PDCP SN and MAC SN of the (MSDUs). In an embodiment of the present disclosure, the WLAN MAC entity tags the mapping between the PDCP SN and the MAC SN with DRB-ID or E-RAB or LCID. Tagging the mapping between the PDCP SN and the MAC SN with bearer ID/DRB ID/E-RAB/LCID is required to provide feedback to the LTE node 102 per GTP-U tunnel about successfully and unsuccessfully delivered PDCP PDUs.

The adapter entity 702, the bearer management entity 708 and the queue management entity 710 are logical entities. Therefore, these entities and their functionalities may either be implemented in a WT node (WLAN AP 106) in a distributed or a centralized manner. The LTE QoS to WLAN QoS mapping function, if present in the WLAN AP 106a, may either be implemented in the adapter entity 702 or the bearer management entity 708.

A GTP-U tunnel per bearer per UE is required for layer 2 aggregation of LTE RAT and WLAN RAT, which is illustrated in the FIG. 7B. In this case, the LTE node 102 may be configured to create a tunnel with the WLAN AP 106a for a DRB of the UE. There is a one-to-one mapping of the DRB and the GTP-U tunnel. The DRB and the tunnel of a UE are mapped using the DRB ID and the tunnel endpoint ID (TEID) of the E-RAB, so that every DRB (E-RAB) is uniquely mapped to the GTP-U tunnel. In this case, the LTE QoS (QCI) or the WLAN QoS (AC) of the DRB is mapped to a TEID, so that the WLAN AP 106a may either directly use the AC of the TEID or use the mapping table to identify the AC of a particular TEID. The TEID values and the corresponding LTE QoS/WLAN QoS information may be exchanged between the LTE node 102 and the WLAN AP 106a using control plane messaging (Xw-AP) when creating the tunnel as described above with reference to FIGS. 5 and 6.

FIG. 7B includes the adapter entity 702, the bearer management entity 708, and the queue management entity 710 implemented at the WLAN AP 106a. The bearer management entity 708 may be configured to maintain the mapping of an Xw-U sequence number or a GTP-U sequence number, and a PDCP sequence number per bearer for flow control. The WLAN MAC entity 706 exchanges information about the successful or unsuccessful delivery of the MSDU (i.e., PDCP PDUs) with the bearer management entity 708 per DRB-ID (i.e., E-RAB), based on tagging information. The bearer management entity 708 may, therefore, generate the flow control feedback on a GTP-U SN basis for each GTP-U packet transported by a particular GTP-U tunnel. The queue management entity 710 may be configured to map a PDCP PDU of each bearer of a particular UE to an appropriate WLAN AC queue 704 of the UE, based on the AC associated with the TEID of the GTP-U tunnel.

Figure 8A:
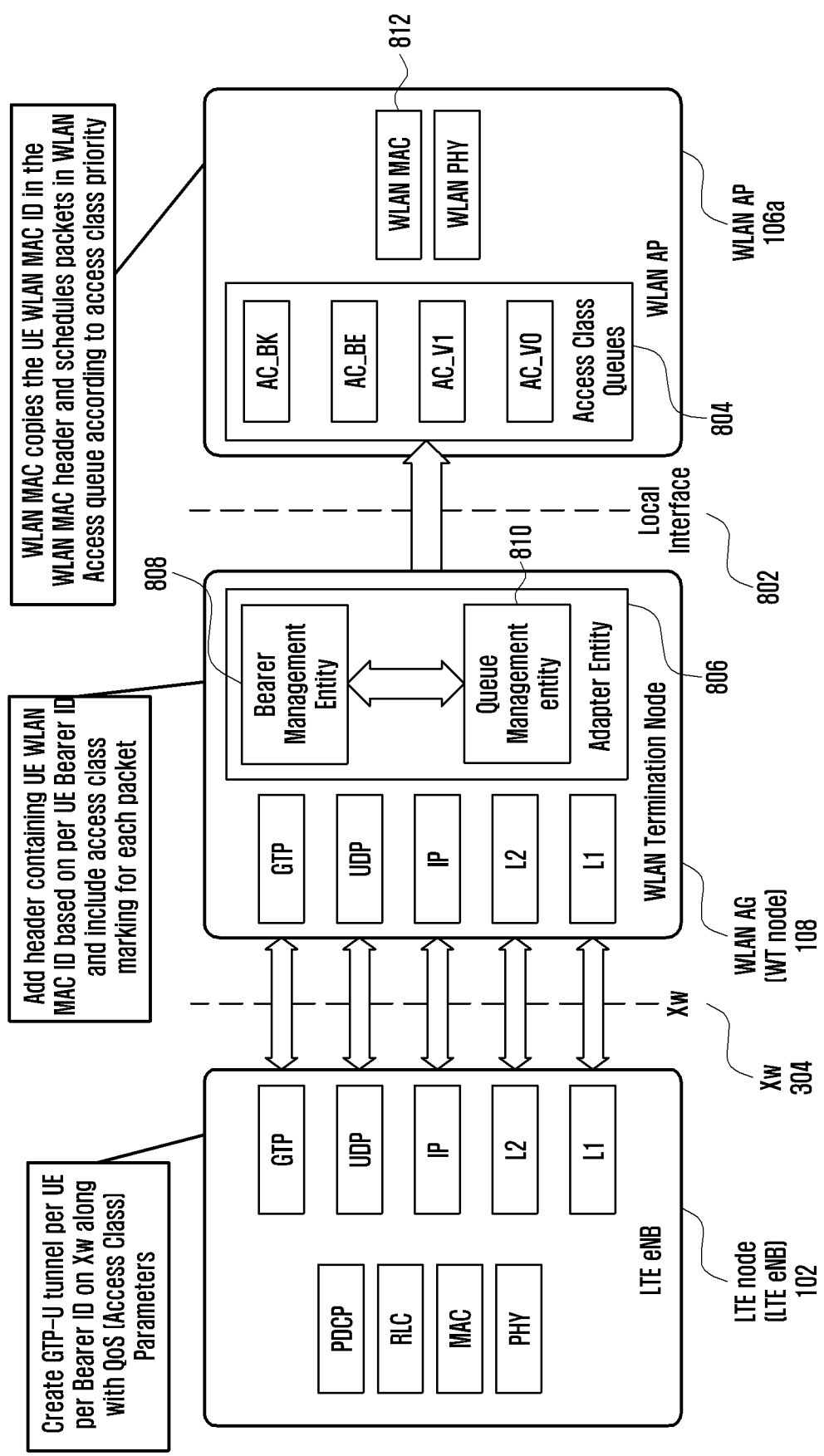
FIGS. 8A and 8B are diagrams of a plurality of entities of a WLAN access gateway (AG) (WT node) and a WLAN AP if an interface between an LTE RAT and a WLAN RAT is terminated in the WLAN AG, according to an embodiment of the present disclosure.
Figure 8B:
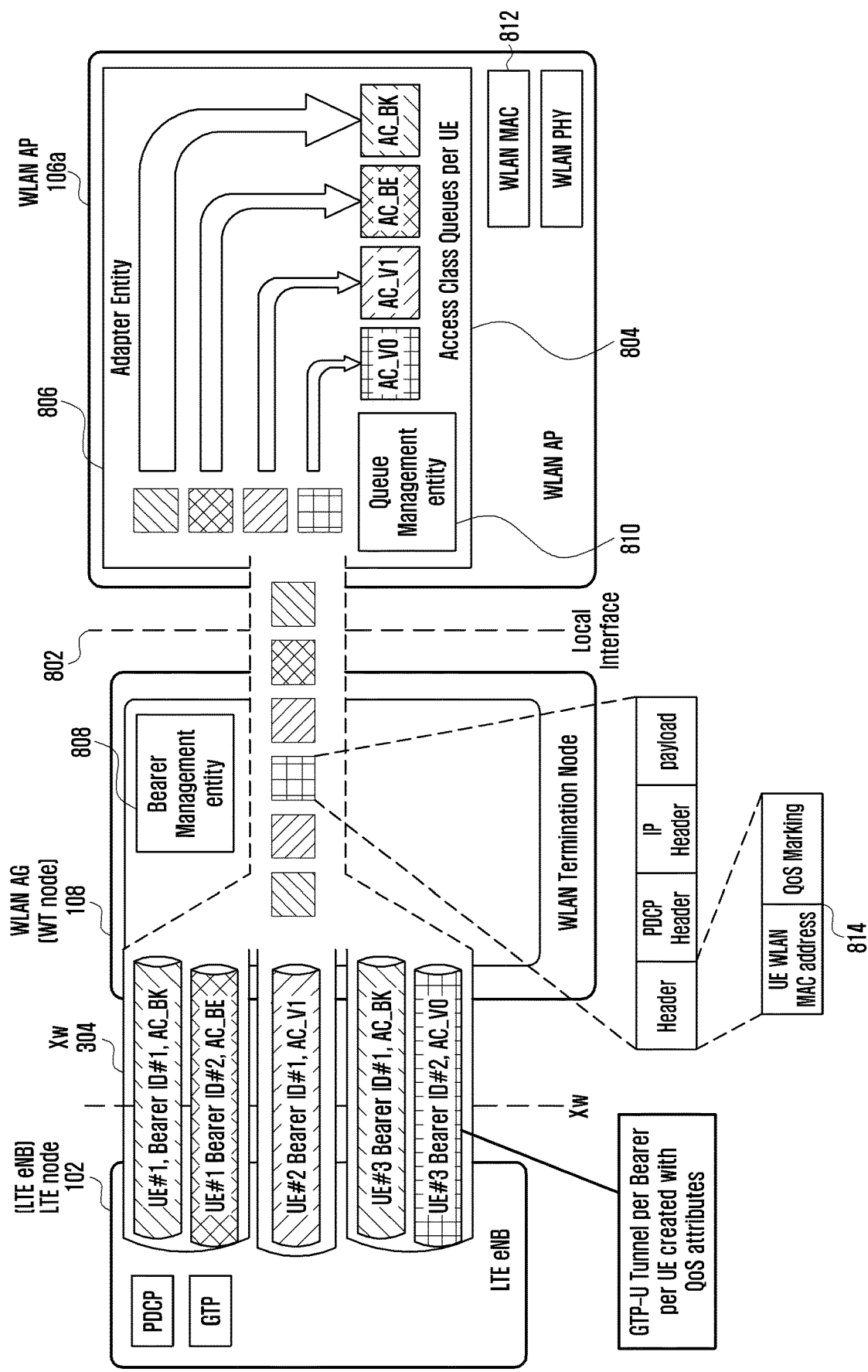

FIGS. 8A and 8B are diagrams of a plurality of entities of a WLAN AG and a WLAN AP if an interface between an LTE RAT and a WLAN RAT is terminated in the WLAN AG, according to an embodiment of the present disclosure. The Xw interface 304 is terminated in the WT node (WLAN AG 108), which is connected to one or more WLAN APs, such as the WLAN AP 106a through a local interface 802, such as an ethernet. A bearer management entity 808 forwards the PDCP PDUs received on the GTP-U to the respective WLAN AP 106a on the local interface 802. The LTE node 102 may be configured to create multiple GTP-U tunnels according to WLAN QoS parameters on the Xw interface 304 for one or more UEs. The GTP-U tunnel per UE per bearer having unique TEID is marked with the WLAN QoS parameters so the adapter entity 806 or bearer management entity 808 is aware of the manner in which delivery of the PDCP PDUs of each GTP-U tunnel to the respective AC queues per UE in the WLAN AP 106a is performed. Alternatively, the LTE node 102 may be configured to create multiple GTP-U tunnels according to LTE QoS parameters on the Xw interface 304 for one or more UEs. In an embodiment of the present disclosure, the adaptor entity 806 may be configured to map the LTE QoS parameters to the WLAN QoS parameters according to one of the mapping methods described above with reference to FIG. 6.

Further, even though a GTP-U tunnel is created per UE per bearer such that its TEID is marked with appropriate LTE QoS parameters or WLAN QoS parameters, the bearer concept may be maintained on the local interface 802 between the WLAN AG 108 and the WLAN AP 106a, because layer 2 transport like an ethernet may be used to forward the data packets (PDCP PDUs) of one or more bearers (GTP-U tunnels) associated with one or more UEs from the WLAN AG 108 to the WLAN AP 106a. In order to maintain QoS characteristics of the bearer (GTP-U tunnel) for the data packets (PDCP PDUs) being transported on the GTU-tunnel, each PDCP PDU may be required to carry WLAN QoS marking associated with QoS characteristic of that particular bearer/GTP-U tunnel if it arrives at the WLAN AP 106a via the local interface 802. For example, if the local interface 802 is an ethernet then an ethernet header (i.e., a WLAN QoS header) 814, is appended to the PDCP PDU. The ethernet header (i.e., a WLAN QoS header) 814 may include at least a destination address in the form of a UE WLAN MAC address and a field for a WLAN QoS marking associated with a QoS characteristic of that particular bearer/GTP-U tunnel. For example, the QoS marking in an ethernet frame is feasible by using the IEEE 802.1Q tag which adds a 32-bit field between the source MAC address and the ethertype/length fields of the ethernet frame header. Out of the 32-bit field the PCP is a 3-bit field which may be used for QoS marking to indicate a priority level of the payload carried in the ethernet frame. If the WLAN AP 106a receives an ethernet frame then the PCP field of the IEEE 802.1Q tag may be used for the AC classification to queue the packets in appropriate AC queues 804. The queue management entity 810 at the WLAN AP 106a may be configured to map the ethernet frames to the appropriate AC queues 804 for a particular UE. The bearer management entity 808 or the adapter entity 806 adds the ethernet header 814 in front of the PDCP header before forwarding the packet (PDCP PDU) on the local interface 802.

LTE QCI to QoS field marking mapping is described below. If the QoS field marking is based on a PCP or other fields like class of service (CoS) or type of service (ToS) then the priority level of the QCI associated with the GTP-U tunnel may be mapped to the priority level indicated by the PCP/CoS/ToS field. Such mapping may be similar to prioritized QoS described above with reference to Table 1. The LTE node 102 configures an EPS bearer on the Xw interface 304 with a specific QCI value which has an associated priority level. In this case, the WT node (WLAN AG 108) is configured to maintain the mapping between the QCI value and the QoS marking field like the PCP in the ethernet header 814 or CoS/ToS in some other headers added in front of the PDCP header of each PDCP PDU.

WLAN Access Class to QoS field marking mapping is described below. If the LTE node 102 configures an EPS bearer on an Xw interface 304 with a specific WLAN AC which has an associated user priority level, then a WT node (WLAN AG 108) may be configured to directly map the UP associated with the WLAN AC category with the QoS marking field like the PCP/CoS/ToS. The WT node may be configured to add the QoS marking field to the header 814 of an ethernet frame comprising one or more packets (PDCP PDUs) as payload which is then forwarded on the local interface 802 between the WLAN AG 108 and an appropriate WLAN AP 106a. FIG. 8B illustrates the LTE RAT and the WLAN RAT aggregation functionality, where the bearer management entity 808 is at a WT node (WLAN AG 108) and the queue management entity 810 is at the WLAN AP 106a, which maintain the QoS characteristics on the local interface 802. The queue management entity 810 is configured to deliver the PDCP PDUs received on the local interface 802 to appropriate AC queues 804 of that particular UE. The bearer management entity 808 at WLAN AG 108 which provides the PDCP packet for QoS marking may also be configured to maintain the mapping of GTP-U SN or PDCP SN to WLAN MAC SN per radio bearer or per GTP-U tunnel. The queue management entity 810 is configured to determine the AC queue and UP from the provided QoS marking field such as PCP/ToS/CoS in the header 814 of the packet transported on the local interface 802.

In LTE, the QCI is associated per EPS bearer (i.e. per DRB ID). LTE MAC header carries LCID in each user plane packet i.e., LTE MAC PDU. One-to-one mapping of LCID and DRB ID implies one QCI value per LCID. In WLAN, WLAN QoS parameters are associated with AC categories for prioritized QoS. The LTE node 102 configures a QCI value for the LCID/DRB ID. The LCID/DRB ID is carried in the PDCP header of the data packet from the LTE node 102 transmitter entity (PDCP) to the WLAN MAC entity 812 and from the WLAN MAC entity 812 to the reception entity (PDCP) of the UE 104a. Since the LTE MAC entity is not involved in the transmission reception path of the PDCP PDU transported via the WT node, the DRB ID is preferred in the PDCP header instead of the LCID. Based on LCID/DRB ID in every packet (PDCP PDU), and the TEID marked with the UE WLAN MAC identity and the QoS marking in the header 814, the queue management entity 810 can be configured to map the PDCP PDU to a particular AC queue 804 of that UE to enforce uniform QoS for packets transmitted through WLAN air interface.

A embodiment of the present disclosure provides flow control mechanism for the aggregation of the LTE RAT and the WLAN RAT. The architecture for LTE-WLAN aggregation at radio layer is based on a DC framework. The interface between an LTE node and a WT node (WLAN node) is a standardized Xw interface described below. The flow control mechanism between these two nodes may be based on GTP-U, which is used for an Xw user plane (Xw-UP) protocol. In Release-12, a DC X2 UP protocol layer uses services of the transport network layer in order to allow flow control of user data packets transferred over the X2 interface between a master eNB (MeNB or LTE node 102) and a secondary eNB (SeNB). The data management, feedback mechanism and the like in both the MeNB and the SeNB are the same, because both nodes are based on an LTE user protocol relying on feedback from a radio link control (RLC) layer for flow control. However, this is not the case with flow control handling for LTE-WLAN aggregation, because the user plane protocol in MeNB is based on LTE while the user plane protocol in SeNB is based on WLAN. Even though it is not possible to reuse the same concept of flow control as defined for an X2 UP protocol layer, it is possible to introduce a new flow control mechanism for user data packets transferred over the Xw-UP interface between the LTE eNB and the WLAN AP.

In an embodiment of the present disclosure, a flow control method is based on mapping of a PDCP SN and a WLAN MAC SN for flow control between an LTE node and a WT node, wherein the feedback status is provided by the WT node.

In an embodiment of the present disclosure, a flow control method is based on mapping of a GTP-U SN and a WLAN MAC SN for flow control between an LTE node and a WT node, wherein the feedback status is provide by the WT node.

In an embodiment of the present disclosure, a flow control method is based on mapping of a PDCP SN and a WLAN MAC SN for flow control between an LTE node and a WT node, wherein the feedback status is provide by the UE.

The LTE node 102 and the WLAN AP 106a or WLAN AG 108 work on different types of user plane protocols, so one-to-one mapping between a PDCP SN and a WLAN MAC SN is not possible. To maintain the flow control between two nodes for user data packets transferred over the Xw-UP interface, it is important for the LTE node 102 to be aware of the status of each PDCP PDU and the amount of PDCP PDUs to be provided on Xw-UP. To support the same, there is need to introduce a new mechanism between the WT node (WLAN AP 106a/WLAN AG 108) and the LTE node 102 which may determine the mapping between the PDCP SN of the PDCP PDU and the MAC SN of the WLAN MAC PDU. Thus, whenever the WLAN MAC PDU is successfully delivered to the UE some entity at the WT node (WLAN AP 106a/WLAN AG 108) may mark the PDCP packet as successful and share the status with the LTE node 102. The various possible approaches with which the WT node may provide feedback to the LTE node are described below. The method described below apply regardless of Xw being terminated in the WLAN AP 106a or Xw being terminated at the WT node (WLAN AC or WLAN AG 108).

In an embodiment of the present disclosure, a local reference number (LRN) for each PDCP PDU is created and shared with the WT/WLAN AP.

If the PDCP packet is received by the WT node (WLAN AP 106a or WLAN AG 108) on a particular bearer associated with the UE 104a, the adapter entity creates a local reference number (LRN) for each received PDCP packet per UE per bearer. This LRN may be shared with the WLAN MAC if the received PDCP PDU is delivered to the appropriate access class queue. The LRN may be used to determine the mapping between the PDCP SN and the WLAN MAC SN at the WLAN MAC. If the WLAN MAC assigns the MAC SN to each MAC PDU (M-PDU), it determines the LRN associated with that packet and maintains mapping between the LRN and the MAC SN. The mapping entity in the WLAN MAC may report the determined mapping to the adapter entity in the WT node (WLAN AP 106a or WLAN AG 108) for each PDCP PDU. After receiving the mapping, the adapter entity at the WT node (WLAN AP 106a or WLAN AG 108) may maintain the PDCP SN to the MAC SN mapping, based on information provided for each LRN. The adapter entity in the WT node may mark the PDCP packet as successful or not successful based on the status provided by the WLAN MAC for the MAC SN. Alternatively, the WLAN MAC may maintain the mapping between the LRN and the MAC SN and, based on the feedback received from the UE, the WLAN MAC informs the adapter entity in the WT node (WLAN AP 106a or WLAN AG 108) of the status of each LRN. On receiving the status of each LRN, the adapter entity at the WT node (WLAN AP 106a or WLAN AG 108) may mark the PDCP PDU as successfully delivered or not successfully delivered. The adapter entity also maintains a mapping between the LRN and the GTP-U SN. The adapter entity then uses the status of the LRN reported by the WLAN MAC for flow control on the Xw-UP per bearer per UE, providing the feedback for each GTP-U SN received from the LTE node.

In an embodiment of the present disclosure, the WLAN MAC maintains the PDCP SN of each packet to create a mapping between the PDCP SN and the WLAN MAC SN.

If the PDCP packet is received by the WT node (WLAN AP 106a or WLAN AG 108) on a particular bearer (GTP-U tunnel) associated with the UE 104a, the adapter entity delivers the PDCP PDU to an appropriate AC queue of that UE, based on the QoS marking, where the packet is treated as an M-SDU. Since the PDCP header is not encrypted, it is possible for the mapping entity in the WLAN MAC to determine the PDCP SN and DRB ID/LCID/E-RAB of the received packet. The mapping entity in the WLAN MAC determines the PDCP SN and the DRB ID for each packet, stores the PDCP SN and the DRB ID for each packet in a local database, and while processing each packet, and while forming a MAC PDU (M-PDU) by assigning the MAC SN, for each packet, the mapping entity determines the mapping between the PDCP SN and the WLAN MAC SN per bearer based on the DRB ID/LCID/E-RAB. The mapping entity in the WLAN MAC may report the determined mapping to the adapter entity in the WT node (WLAN AP 106a or WLAN AG 108) for each PDCP PDU per bearer per UE. After receiving the mapping, the WT node (WLAN AP 106a or WLAN AG 108) may maintain the mapping between the GTP-U SN and the PDCP SN based on the information provided by the WLAN MAC. The WT node (WLAN AP 106a or WLAN AG 108) may later mark the PDCP packet (i.e., the GTP-U packet) as successfully delivered or not successfully delivered based on a status provided by the WLAN MAC mapping entity. Alternatively, the WLAN MAC may maintain the mapping between the PDCP SN and the MAC SN and only inform the WT node of the status of each PDCP PDU. After receiving the status from the mapping entity in the WLAN MAC, the adapter entity at the WT node (WLAN AP 106a or WLAN AG 108) may mark the GTP-U SN as successfully delivered or not successfully delivered. The adapter entity then uses the status of the GTP-U SN (i.e., the PDCP SN) for flow control on the Xw-UP per bearer per UE.

In an embodiment of the present disclosure, a WLAN termination node predicts a mapping based on parameters configured by the WLAN.

After the WLAN AP 106a configures parameters, the WLAN AP 106a provides a few of the parameters to the WT node (WLAN AC or WLAN AG 108) entity, which is required to determine the mapping between the PDCP SN and the WLAN MAC SN. In this case, the WLAN AP 106a shares the parameters like fragmentation threshold, concatenation or aggregation, and possible WLAN header size in bytes. After the WT node (WLAN AC or WLAN AG 108) entity receives the PDCP packet, the WT node determines the possible packet size based on the parameters provided by the WLAN AP 106a, by comparing the size of the PDCP data packet with the fragmentation threshold and concatenation parameters provided by the WLAN AP 106a. The WLAN AP 106a determines the number of fragmented or concatenated packets by comparing the size of the PDCP PDU to these parameters and considering possible header fields, determines the possible WLAN MAC SN, and maintains the mapping between the PDCP SN and the WLAN MAC SN. The WLAN MAC, after receiving the PDCP packet, processes the PDU and, from the M-PDU, by assigning the WLAN MAC SN, and transmits the processed PDU to the UE 104a. After the receiver entity (i.e., UE WLAN MAC entity) acknowledges the successful reception of the MAC SN to the transmitter entity (i.e., WLAN AP 106a), the WLAN AP 106a informs the WT node entity (WLAN AG 108) of the status of each MAC SN.

After receiving the same adapter entity, the WT node (WLAN AC or WLAN AG 108) may mark the PDCP PDU associated with that WLAN MAC SN as successfully delivered or not successfully delivered The adapter entity then uses the status of the PDCP SN, which is mapped to the GTP-U SN, for flow control on the Xw-UP per bearer per UE.

In the case where multiple bearers are offloaded to the WLAN with the same QoS requirements, the WT node (WLAN AC or WLAN AG 108) or WLAN MAC may apply any one of the flow control method described above by considering common WLAN MAC SN space i.e., different PDCP PDU from different bearers may be mapped to a common MAC entity. The bearers, with different QoS requirements, have different WLAN MAC SN spaces. The mapping rules are the same in both cases.

Figure 9A:
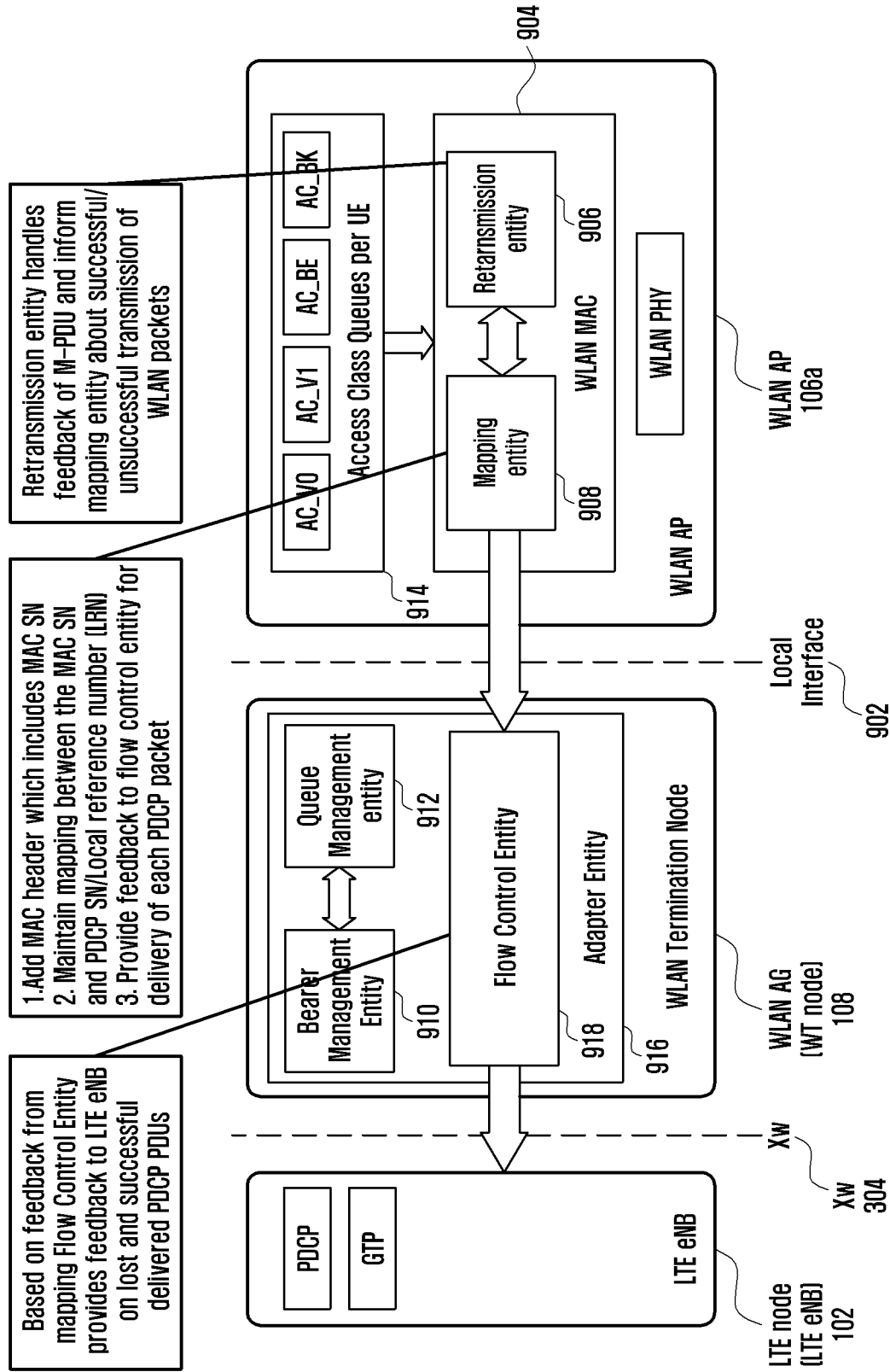
FIGS. 9A and 9B are diagrams of a plurality of entities of a WLAN AG (WT node) and a WLAN AP implementing a flow control mechanism at the WT node to control a data rate at which data packets of an offloaded DRB are received from an LTE node, according to an embodiment of the present disclosure.
Figure 9B:
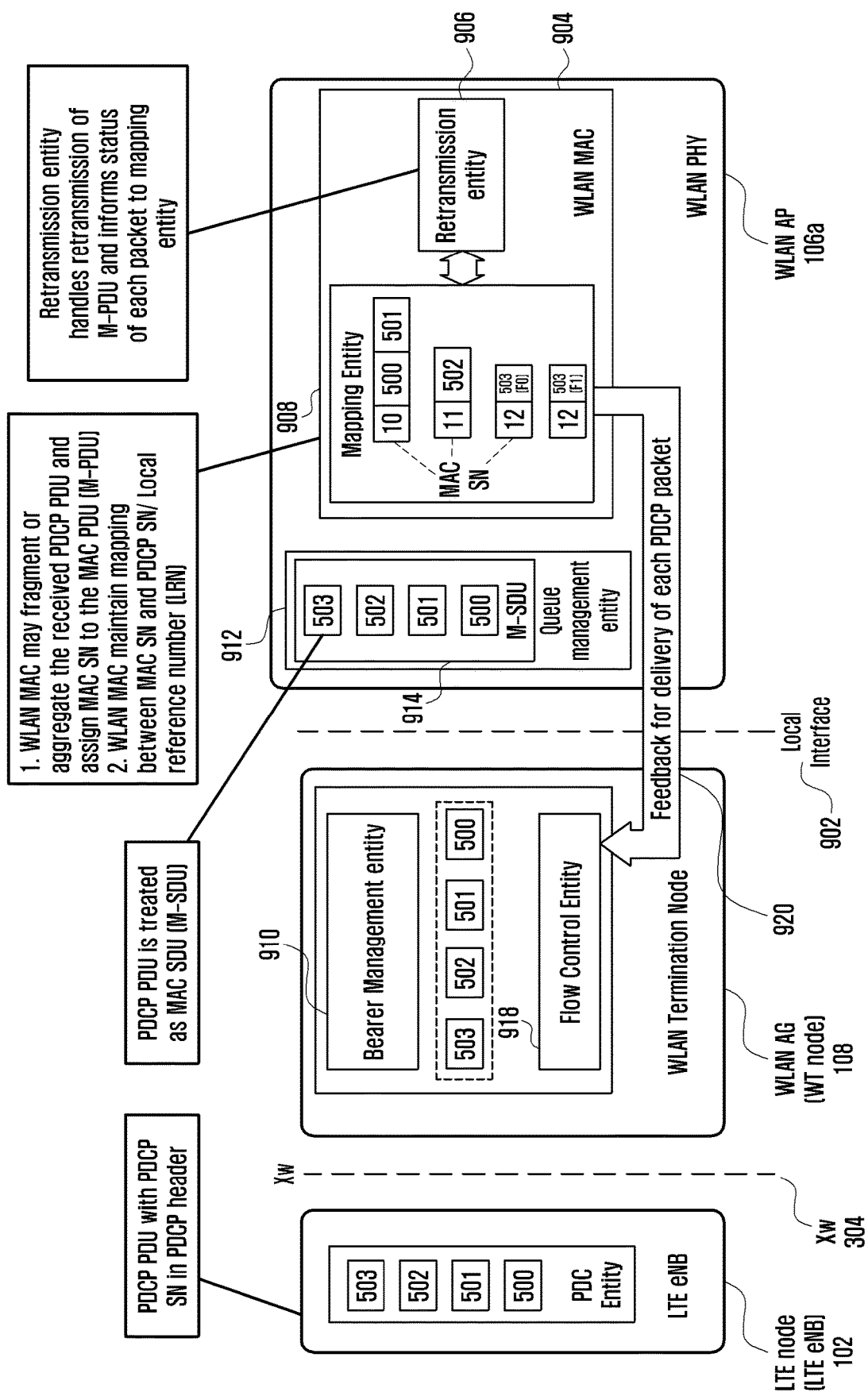

FIGS. 9A and 9B are diagrams of a plurality of entities of a WLAN AG (WT node) and a WLAN AP implementing a flow control mechanism at the WT node to control a data rate at which data packets of an offloaded DRB are received from an LTE node, according to an embodiment of the present disclosure. The WT node (the WLAN AG 108) is further connected to a plurality of WLAN APs, such as WLAN AP 106a, through the local interface 902. The PDCP entity which is created per bearer in the LTE node 102 assigns the PDCP SN to each PDCP PDU (for example, 500, 501, 502, and 503). The PDCP entity in the LTE node 102 is per UE per bearer entity. The PDCP entity assigns the PDCP SN and includes the LCID/DRB ID in each PDCP packet in the PDCP header and sends the packets to the GTP entity.

The GTP entity, is also per UE per bearer entity. The GTP entity appends the GTP-U header in front of the PDCP header. Further, the GTP entity transports the PDCP PDU appended with the GTP-U header on the GTP-U tunnel associated with the bearer to the WLAN AG 108. The appended GTP-U header comprises the GTP-U SN for the PDCP PDU payload transported on the GTP-U tunnel associated with the bearer. The GTP-U header containing the GTP-U SN is also referred as an Xw-SN. A bearer management entity 910 in the WLAN AG 108, based on the TEID of the GTP-U tunnel, removes the GTP-U header but maintains the mapping between the GTP-U SN or the Xw-SN inside the GTP-U header and the PDCP SN inside the PDCP header for each data packet received on each established GTP-U tunnel.

The bearer management entity 910 may be configured to handle the received data packets (PDCP PDUs) transported on the respective GTP-U tunnels, which must be buffered at the WLAN AP 106a according to the WLAN QoS characteristics that are identified according to the WLAN AC and UP parameters associated with the bearer (GTP-U tunnel) after translation or mapping. The bearer management entity 910 may be configured to either deliver the received PDCP PDU after removing the GTP-U header, to appropriate AC queues (if the Xw interface 304 is directly terminated at the WLAN AP 106a) associated with the UE or sending one or more PDCP PDUs with the same QoS characteristics on the local interface 902 after adding an appropriate header containing the QoS marking field.

The queue management entity 912 may be configured to deliver the packets (PDCP PDUs) of a particular UE belonging to a particular bearer (GTP-U tunnel) to the respective AC queue according to the WLAN AC and UP parameters associated with the bearer. In an embodiment of the present disclosure, the queue management entity 912 may also be configured to maintain the mapping between the PDCP SN and the WLAN MAC SN per UE per bearer. Based on the TEID or UE WLAN MAC address in the header containing the QoS marking field, the data packet reaches a WLAN MAC 904, where the data packets are treated as a MAC SDU (M-SDU) by a queue management entity 912 and buffered in appropriate AC queues 914. Every M-SDU is equivalent to a PDCP PDU. The WLAN MAC 904 has mapping entity 908 which may fragment or aggregate the M-SDU to form a MAC PDU (M-PDU) based on parameters configured by a wireless network operator of the wireless communication system 100.

The mapping entity 908 is present in the WLAN MAC 904 and may be configured to perform the following tasks:
1. Fragment the M-SDU or concatenate (aggregate) the multiple M-SDUs to form an M-PDU based on the parameters configured by wireless network operator;
2. Add a MAC SN to each M-PDU;
3. Detect the PDCP SN and the DRB ID/E-RAB of each packet (M-SDU) from the PDCP header and determine the mapping between the PDCP SN and the WLAN MAC SN per UE per bearer;
4. If the LRN is assigned to the PDCP PDU then optionally store the LRN in its database and then, while forming an M-PDU, determine the WLAN MAC to the PDCP SN mapping per UE per bearer;

5. Maintain and store the mapping between the PDCP SN or the LRN and the WLAN MAC SN per UE per bearer;
6. Provide status to the flow control entity 918 for each PDCP packet or M-PDU or M-SDU for each PDCP SN or local reference number or WLAN MAC SN per UE per bearer based on feedback received from the UE for the transmitted M-PDU; and
7. Interact with the retransmission entity 906 to determine which packet is successfully transmitted or not for re-transmission purposes.

The WLAN MAC 904 may be configured to assign a MAC SN to each M-PDU, and a mapping entity 908 may be configured to maintain the mapping between the PDCP SN or an LRN and a MAC SN per UE per bearer based on a TEID/DRB ID/UE WLAN MAC address. Multiple M-SDUs may be concatenated into a single M-PDU, where multiple PDCP PDUs (each having a different PDCP SN) may be concatenated to a single M-PDU with the same WLAN MAC SN. Alternatively, a single M-SDU may be fragmented into multiple M-PDUs with the same MAC SN, where the PDCP PDU may be fragmented into multiple M-PDUs with the same WLAN MAC SN (fragment packets belonging to same SDU have the same WLAN MAC SN). A retransmission entity 906 may be configured to retransmit each M-PDU and informs the mapping entity 908, as shown in FIGS. 9A and 9B, of the status of each packet. The retransmission entity 906 may be configured to provide feedback for each M-PDU received from the UE on a WLAN air-interface and inform the mapping entity 908 of the successful/unsuccessful transmission of each WLAN packet. The retransmission entity 906 may directly inform the flow control entity 918 of the transmission status for each PDCP packet, M-PDU, or M-SDU for each PDCP SN, LRN, or WLAN MAC SN per UE per bearer.

The flow control entity 918 can be configured to maintain the successful and unsuccessful transmission status for each PDCP packet per UE per bearer based on status provided by the mapping entity 908 in WLAN AP 106a. On receiving the status of each M-PDU from retransmission entity 906, the mapping entity 908 can be configured to inform the status to a flow control entity 918 in WLAN AG 108 for each PDCP PDU, where the status of either MAC SN or PDCP SN or LRN is informed depending on the mapping approaches used during implementation. On receiving the feedback 920 from the mapping entity 908 the flow control entity 918 can be configured to determine the successful and unsuccessful transmission of each PDCP PDU per UE per bearer as shown in FIG. 9b. If LTE node 102 requests status of the PDCP packet or the GTP packet, the flow control entity 918 may be configured to form the data delivery status PDU such as PDU type 1 and provide the status PDU to the LTE node 102. The flow control entity 918 may be configured to determine the mapping between the GTP-U SN and the PDCP SN if the request for status from the LTE node 102 is on the GTP-U SN or the Xw-SN basis.

Flow control may be per UE per GTP-U tunnel, regardless of one or more bearers associated with the UE mapped to the respective GTP-U tunnels.

Figure 10:
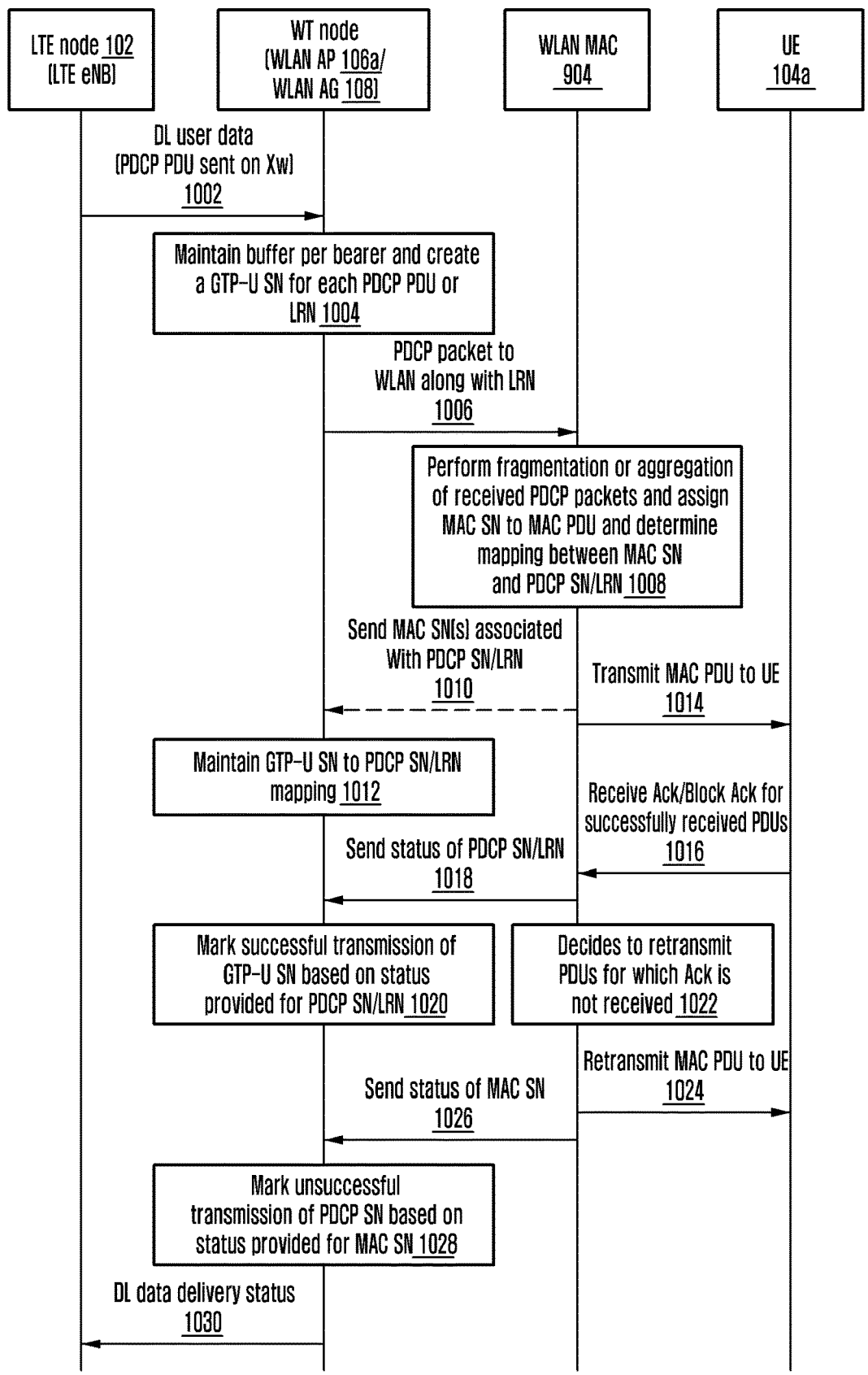
FIG. 10 is a sequence diagram of a flow control mechanism at a WT node, according to an embodiment of the present disclosure.

FIG. 10 is a sequence diagram of a flow control mechanism at a WT node, according to an embodiment of the present disclosure. The LTE node 102 sends, at step 1002, a PDCP packet to the WT node (WLAN AP 106a or WLAN AG 108) over an Xw interface 304 through an established GTP-U tunnel. The PDCP packet is sent as a GTP-U packet through the established GTP-U tunnel. The WT node maintains, at step 1004, a buffer per bearer and maintains a mapping between a GTP-U SN and a PDCP SN. Alternatively, an LRN is created for each PDCP PDU. The WT node sends, at step 1006, the PDCP packet to the WLAN MAC along with the LRN. These packets are treated as an M-SDU at the WLAN MAC. The WLAN MAC 904, after receiving the PDCP packet, at step 1008, fragments or concatenates each M-SDU and forms an M-PDU by assigning the WLAN MAC SN. The WLAN MAC 904 also determines the mapping between the PDCP SN and the WLAN MAC SN or, alternatively, determines the mapping between the LRN and the WLAN MAC SN. Further, the WLAN MAC 904 sends, at step 1010, the MAC SN(s) associated with the PDCP SN/LRN to the WT node. Step 1010 is optional in the case where status at step 1018 is based on the MAC SN instead of the PDCP SN or the LRN. If multiple bearers are offloaded with the same QoS requirements, the WLAN MAC 904 sends a separate LRN/PDCP SN to the WLAN MAC SN mapping for each bearer. Further, the WT node maintains, at step 1012, the GTP-U SN or the XW-U SN to the PDCP SN mapping for each bearer based on information provided by the WLAN MAC entity 904. The WLAN MAC 904 then transmits, at step 1014, the M-PDU to the UE 104a on the WLAN air interface based on the WLAN QoS parameters. In response, the UE 104a sends, at step 1016, an acknowledgement (ACK/Block ACK) for successfully receiving the PDUs.

After the WLAN MAC 904 receives the acknowledgement, the WLAN MAC 904 determines that the PDCP SN/LRN was successfully delivered to the UE, based the acknowledgement, at step 1016, from the UE. The WLAN MAC 904 sends, at step 1018, the status of each LRN/PDCP SN to the WT node. Optionally the status, at step 1018, may also be based on the MAC SN, if mapping of the MAC SN to the PDCP SN/LRN is conveyed to the WT node at step 1010. Further, the WT node marks, at step 1020, the successful transmission of the GTP-U SN or the Xw-U SN based on the status provided for the PDCP SN/LRN. If the WLAN MAC 904 does not receive the status for a packet, the WLAN MAC 904 determines, at step 1022, to retransmit the packet for which an ACK is not received and retransmits, at step 1024, the MAC PDU. Further, the WLAN MAC 904 waits for a response from the UE 104a for the retransmitted MAC PDU. If the WLAN MAC 904 does not receive an ACK from the UE 104a then the WLAN MAC 904 marks the transmission of the WLAN MAC SN as unsuccessful. Based on the mapping between the PDCP SN and the WLAN MAC SN, the WLAN MAC 904 sends, at step 1026, the status of the PDCP SN or the LRN to the WT node. The WT node then marks, at step 1028, the unsuccessful transmission of the PDCP SN, based on the status provided by the WLAN MAC. Further, the WT node uses the status of the PDCP SN for flow control on the Xw-U per bearer per UE. The WT node forms a "DL DATA DELIVERY STATUS" message (PDU TYPE 1) and shares, at step 1030, the status with the LTE node 102.

The methods described above with reference to FIG. 10 for mapping of the PDCP SN to the WLAN MAC SN may be applicable even at the UE side for the UL DRB whose PDCP PDUs are directly transmitted by the UE 104a to the WLAN AP 106a on the WLAN air interface.

Figure 11:
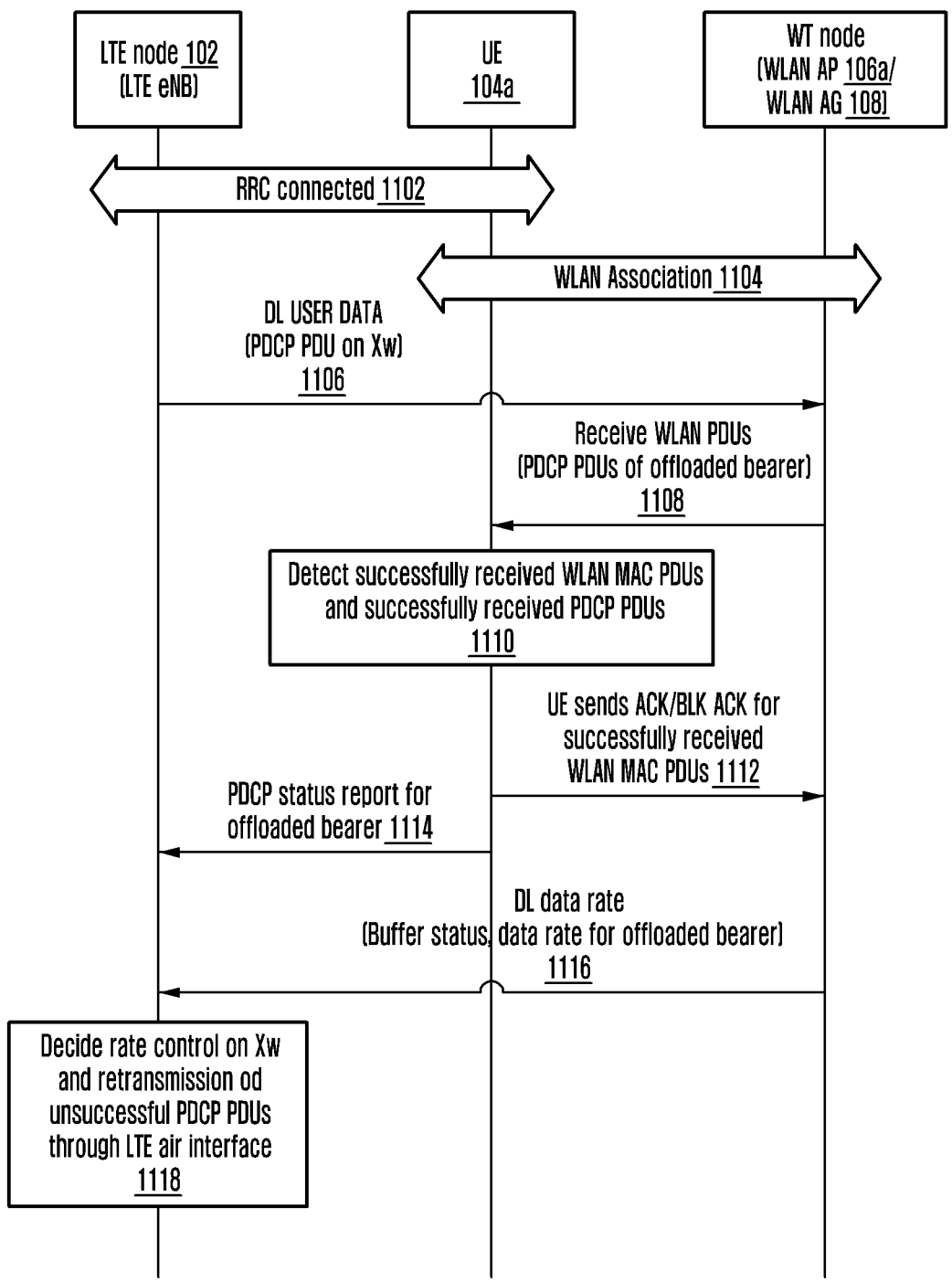
FIG. 11 is a sequence diagram of a flow control mechanism at a UE side, according to an embodiment of the present disclosure.

FIG. 11 is a sequence diagram of a flow control mechanism at a UE side, according to an embodiment of the present disclosure.

Figure 16:
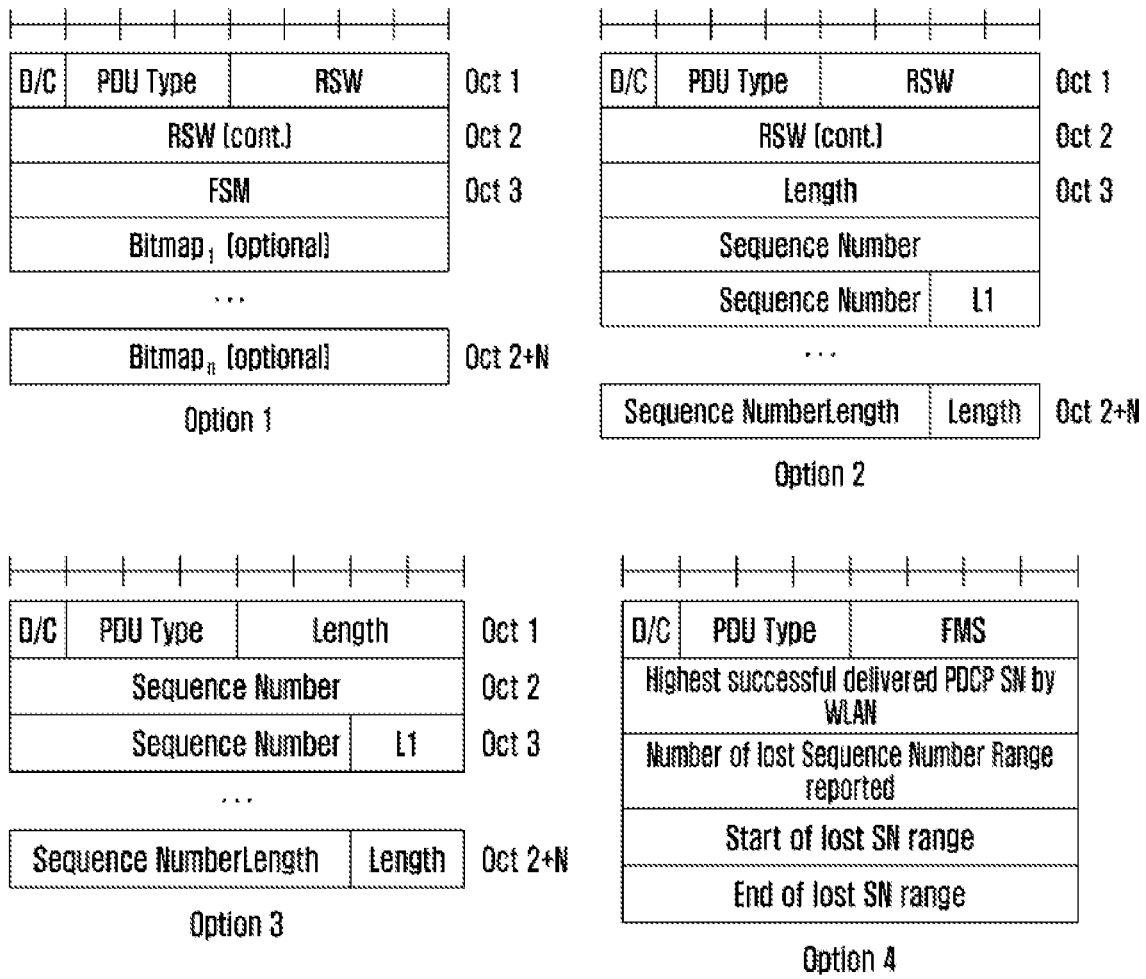
FIG. 16 provides a format for a new PDCP status PDU, according to an embodiment of the present disclosure.

The LTE node 102 requires feedback from the WLAN to control the downlink user data flow via the WT node (WLAN AP 106a or WLAN AG 108). A protocol of the WT node cannot provide the desired information required by the LTE node 102 to provide the flow control. A mechanism is introduced to handle flow control as shown in FIG. 11, where the LTE node 102 receives an input from the UE 104a as well as the WT node (WLAN AP 106a or WLAN AG 108). The sequence of steps followed by the wireless communication system 100 for flow control mechanism involving the UE 104a is described below with reference to FIG. 11. The UE 104a, in the RRC connected state, in step 1102, performs the association procedure, at step 1104, with the WT node (WLAN AP 106a or WLAN AG 108), indicated in the WLAN configuration as described above with reference to FIG. 5 or 6. The LTE node 102 sends the PDCP PDUs of an offloaded bearer over the Xw interface through a "DL USER DATA" message, at step 1106, to the WT Node. Further, the WT node (WLAN AP 106a or WLAN AG 108) processes the PDCP packets, forms the WLAN MAC PDUs, at step 1108, and sends the WLAN MAC PDUs to the UE 104a. The UE 104a, after receiving the packets from WLAN link, detects successfully received WLAN MAC PDUs, at step 1110, and forwards the packets to the PDCP entity which maintains successfully and unsuccessfully received PDCP PDU SNs. Further, the UE 104a sends an ACK/Block ACK for successfully received WLAN MAC PDUs, at step 1112, to the WT node. Further, the UE 104a may share the feedback or the PDCP status report, at step 1114, with LTE node 102 for the offloaded bearer in a new PDCP status PDU so that the LTE node 102 may provide flow control. The UE 104a may provide information like highest successfully delivered PDCP SN and highest successfully delivered PDCP SN by the WLAN, lost SN range, and so on. FIG. 16 below provides a format for the new PDCP status PDU. The various triggers for new the PDCP status PDU are as follows:

1. The UE may control the status PDU based on timers configured by the NW (wireless communication system 100). The NW may configure a periodic timer for the same and on the expiration of the same, the UE may share the status PDU.
2. The status PDU may be sent during an error scenario like RLF, out of service (OOS), or the like. Alternatively, the status PDU may be sent during an error recovery scenario or other scenarios like hand-over (HO), and re-establishment. The NW may control the transmission of the status PDU through a status prohibit timer. The timer may be used by the PDCP entity to prohibit transmission of a status PDU
3. The NW may request the UE to send the packet through an indication or through the new PDCP status PDU, after receiving the packet, the UE may send this new packet to the NW
4. A new PDU type such as an enhanced PDCP status report may be defined whose value is in the range of 010-111. The various options to send this packet are as shown below in FIG. 16.

Further, the WT node determines a data rate, at step 1116, and a buffer status per UE per bearer and provides the information to the LTE node 102 to provide flow control. A new PDU format PDU type 2 may be defined for the information, which may provide the information, or the PDU format PDU type 1 may be enhanced, which may have these additional parameters. The determination of these parameters like data rate and buffer state is described below in the description of WLAN buffer size and status. After receiving the data rate and status report, the LTE node 102 determines the rate control on the Xw interface and the retransmission of unsuccessfully received PDCP PDUs through the LTE air interface, in step 1118.

In an embodiment of the present disclosure, a UE provides a highest received PDCP SN by a UE through a WLAN link (RSW) followed by a missing SN range through a first missing SN (FMS) and bitmap. The parameter indicates feedback about the in-sequence delivery status of PDCP PDUs at the UE to the UE. The RSW may be optional, and the UE may directly provide the FMS.

In an embodiment of the present disclosure, the PDCP PDU format has the RSW, a list length field (LENGTH), and a list of LENGTH number of pairs, as shown above. The various parameters are as below:

1. LENGTH: The number of (SNi, Li)-pairs in the status PDU;
2. SNi: "Sequence Number" of the PDCP PDU, which was not correctly received; and
3. Li: Number of consecutive PDCP PDUs not correctly received following the PDCP PDU with "Sequence Number" SNi.

In an embodiment of the present disclosure, the PDCP PDU format may be as described in the last paragraph, except that there is no RSW field.

In an embodiment of the present disclosure, the PDCP PDU format has FMS, highest successfully delivered SN, and a number of lost SN range along with range.

In an embodiment of the present disclosure, a WLAN data rate and buffer status or size is estimated, as described below.

The WT node (WLAN AP 106a) may be serving multiple UEs, and it is possible that the queues are common for all UEs. Thus, there is need to define a method at the WLAN AP 106a or the adaptor entity which determines the data rate and buffer size per UE and per bearer.

Steps that may be performed to determine a WLAN buffer size/status are described below in Table 6. The WLAN AP 106a may provide the buffer status per UE (multiple bearers) or per bearer or total buffer size or the like. The buffer size may be determined at different levels. An NW operator may determine which information the NW operator wants to share with the MeNB (LTE node 102). The steps may be as follows:

1. The bearer management entity may be aware of how many PDCP PDU's per UE it has put in all the AC queues. Based on the number of PDCP PDU's per UE put in the AC queues, a weight for each UE may be derived such that a sum of the weights is X.
2. The bearer management entity may be aware of how many PDCP PDU's per UE it has put in the AC queues. Based on that the number of PDCP PDU's per UE put in the AC queues, a weight for each UE per AC may be derived.
3. The bearer management entity may be aware of how many PDCP PDU's per UE per bearer it has put in the AC queues. Based on that the number of PDCP PDU's per UE put in the AC queues, a weight for each UE per AC per bearer may be derived.
4. Total buffer status at the WLAN AP or a sum rate may be derived by adding weight for all the UE served by the WLAN AP.
5. Total buffer status per AC may be determined by adding weight for all the UE for every AC served by WLAN AP.

TABLE 6

(Equation 1) Weight per UE (WU): Sum of weight of UE for all AC
WU = Sum of PDCP PDUs per AC (AC-V0 + AC-V1 + AC-BE + AC-BK)
(Equation 2) Weight per UE per AC (WU-AC): Sum of UE per AC
WU-AC = Sum of PDCP PDUs per AC - Single AC
(Equation 3) Weight per UE per AC per bearer (WU-AC-Bearer): Sum of UEs per AC per bearer
WU-AC-Bearer = Sum of PDCP PDUs per UE per AC per bearer (Multiple bearer)
(Equation 4) Total buffer status or size (TBS): Sum of weight of all UEs served through the WLAN
TBS = $WU_1 + WU_2 \ldots WU_n$
(Equation 5) Total buffer status per AC: Sum of weights of all UEs served through specific AC
TBS-AC = WU-AC {Sum of (UE1 + UE2 . . . UEn)}

The WLAN data rate may be determined at different levels as described below with reference to Table 7. The NW operator may determine which information it wants to share with the LTE node 102 (i.e. MeNB) In an embodiment of the present disclosure, the WLAN rate per UE may be calculated based on weight per UE and sum rate (i.e., total buffer status).

In an embodiment of the present disclosure, the WLAN rate per UE per AC may be determined from the weight assigned to the queues or AC. Thus, there may be weight per queue and weight per UE on which the rate per UE per bearer may be estimated.

In an embodiment of the present disclosure, the WLAN rate per UE per AC may be determined based on total buffer status per AC. The rate may be derived per UE, depending on the weight assigned to the queues or AC. Thus, there may be a weight per queue and a total buffer status on which the rate per UE per bearer may be estimated.

In an embodiment of the present disclosure, the WLAN rate per UE per AC may be determined based on the weight assigned to the queues or AC total buffer status per AC, on which the rate per UE per bearer may be estimated.

In an embodiment of the present disclosure, the WLAN rate per UE may be determined based on the weight per UE and total buffer status per AC.

In an embodiment of the present disclosure, the WLAN rate per UE may be calculated based on total buffer status per AC and total buffer status across all UEs.

In an embodiment of the present disclosure, the WLAN rate per UE may be determined based on weight assigned to the queues or AC per bearer to the total weight assigned to the AC or queues per UE.

TABLE 7

Option 1: WLAN data rate = WU/TBS
Option 2: WLAN data rate = WU-AC/WU
Option 3: WLAN data rate = WU-AC/TBS
Option 4: WLAN data rate = WU-AC/TBS-AC
Option 5: WLAN data rate = WU/TBS-AC
Option 6: WLAN data rate = TBS-AC/TBS
Option 7: WLAN data rate = WU-AC-bearer/WU-AC NOTE:
All equations valid for WU-AC may also be valid for WU-AC bearer.

In an embodiment of the present disclosure, the WLAN throughput per UE may be determined as the sum of packets in all queues divided by the observation time, which provides the throughput on a wireless fidelity (Wi-Fi) interface for all bearers and all UEs the WLAN is processing.

In an embodiment of the present disclosure, a "DL DATA DELIVERY STATUS" message from the WLAN AP 106a (new PDU Type) is provided.

The WLAN AP 106a provides feedback to the MeNB through PDU type 2 or enhanced format for PDU type 1. New (option 1) or enhanced PDU type (option 2) frame formats are defined to transfer feedback to allow the receiving MeNB to control the downlink user data flow via the WLAN AP 106a.

All possible options related to feedback like WLAN data rate, buffer size or status, or throughput may use the formats described below to share the information with the MeNB. Alternatively, the LTE node 102 (i.e., MeNB) may also ask for specific details from the WLAN AP. The formats described below consider a few options; however these are applicable for every possible option described above.

In an embodiment of the present disclosure, a format for PDU type 2 is provided.

The PDU type 2 may contain the fields shown in Table 8 below. The WLAN AP 106a may provide a WLAN buffer size or status for the E-RAB/UE. The WLAN AP 106a may also provide a WLAN data rate per UE/per bearer along with a highest delivered PDCP SN. These new fields may facilitate flow control at the LTE node 102 (i.e. MeNB). The sequence of these fields may be changed. The WLAN AP 106a may also provide throughput per UE per bearer or per AC.

TABLE 8

| Bits | | | | | | | | Number |
|---|---|---|---|---|---|---|---|---|
| 7 | 6 | 5 | 4 | 3 | 2 | 1 | 0 | of Octets |
| PDU Type (=2) | | | | Spare | | | | 1 |
| Highest successfully delivered PDCP Sequence Number | | | | | | | | 2 |
| WLAN buffer size for the E-RAB/UE | | | | | | | | 1 |
| WLAN data Rate per UE/per bearer | | | | | | | | 4 |
| Spare extension | | | | | | | | 0-4 |

In an embodiment of the present disclosure, an enhanced PDU format for PDU type 1/1a is provided.

The enhanced PDU type 1 or 1a or PDU type 1 may contain a WLAN buffer size for the E-RAB or UE. Additionally, it may contain a WLAN data rate per UE or per bearer. The fields which are currently present in PDU type 1 like PDCP SN, lost packets, and so on may be optional for the WLAN AP 106a. These values may or may not be provided depending upon the NW operator implementation and handling of packets. The PDCP SN may be determined based on a method described above.

Thus, the new flow control mechanism may enable the LTE node 102 to determine a data rate control on the Xw interface and the retransmission of unsuccessfully received PDCP PDUs through the LTE air interface.

Figure 12:
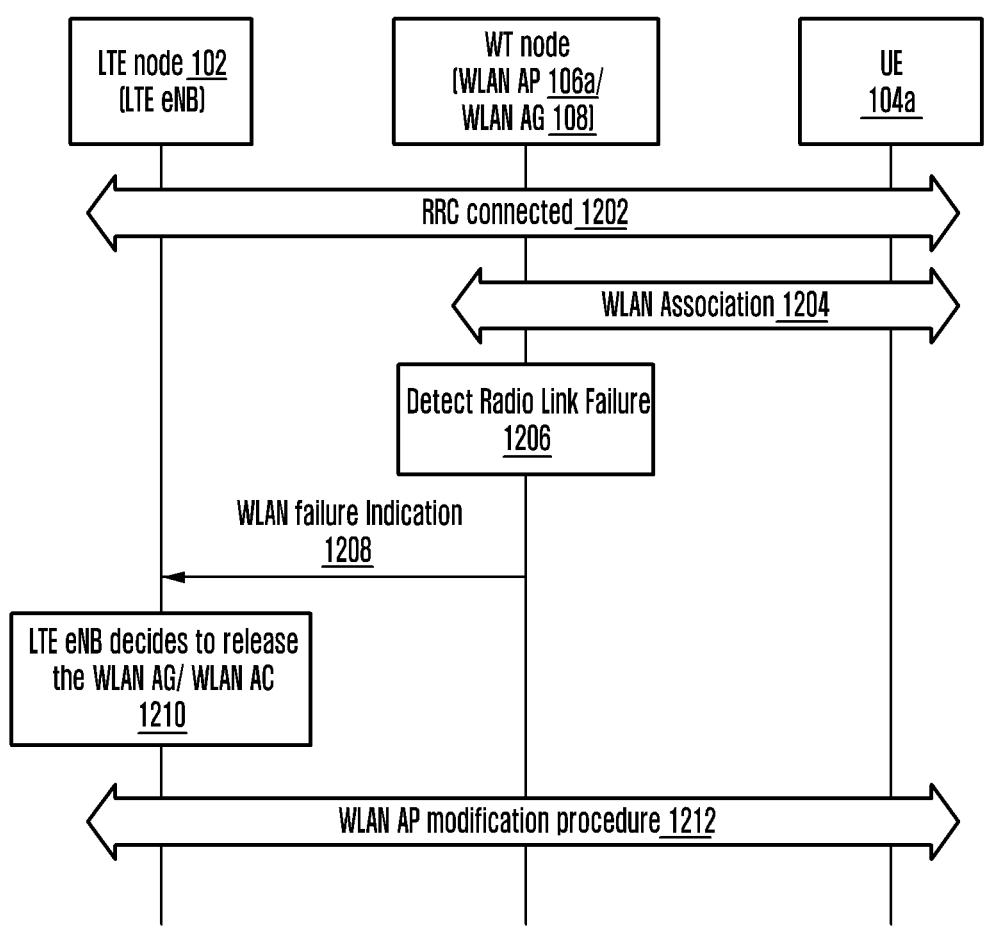
FIG. 12 is a sequence diagram for providing radio link failure (RLF) feedback to an LTE node from a WLAN AP, according to an embodiment of the present disclosure.

FIG. 12 is a sequence diagram for providing RLF feedback to an LTE node from a WLAN AP, according to an embodiment of the present disclosure.

In DC, a secondary cell group (SCG) failure may be due to two reasons: either due to RLF during normal operation or due to expiration of a T307 timer before a random access channel (RACH) is completed. After such a condition occurs, the UE 104a sends the SCG failure to the MeNB, and the MeNB takes appropriate action to recover from the error scenario.

However, in LTE and Wi-Fi aggregation, such triggers cannot be used because there is no RLF concept in Wi-Fi. Thus, there is a need to introduce a mechanism to detect RLF at the NW side. Absence of such detection may lead to a significant packet drop and may impact the data rate. FIG. 12 provides a mechanism for providing RLF feedback to the LTE node 102 from the WT node (WLAN AP 106a or WLAN AG 108) The UE 104a is connected to the LTE node 102 as well as the WLAN through LTE RAT and WLAN RAT aggregation mechanism, at steps 1202 and 1204. After the WT node detects RLF, at step 1206, or an error in connection or a disconnection from the UE 104a, the WT node informs the LTE node 102 about the WLAN link failure indication, at step 1208, over the Xw interface so that the LTE node 102 may take appropriate action. The WT node may also inform of the last successful PDCP SN, the number of lost packets, and so on. The WT node may reuse the existing mechanism to detect the RLF such as a connection lost due to signal condition, packet loss, or triggers which can cause a disconnect of the UE with the WT node and so on. After receiving the last successful PDCP SN, the number of lost packets, and so on, the LTE node 102 may decide to release, reconfigure, or suspend, at step 1210, the WT node (WLAN AP 106a or WLAN AG 108). The LTE node 102 (i.e. MeNB) may retransmit the unacknowledged PDCP packets over a new WLAN link or through the LTE. Further, the LTE node 102 may start the WLAN AP modification procedure, at step 1212, to resume the WLAN services.

Apart from the trigger described above, a few more triggers may be added or introduced at the WT node which may help to determine RLF. The triggers may be based on the following:
1. If the WLAN buffers start overflowing, the WT node should inform the adaptor entity about the failure;
2. If the adaptor entity runs out of SNs or its buffer is full with PDCP packets; and
3. There is a significant loss of packets above a predetermined threshold.

Figure 13:
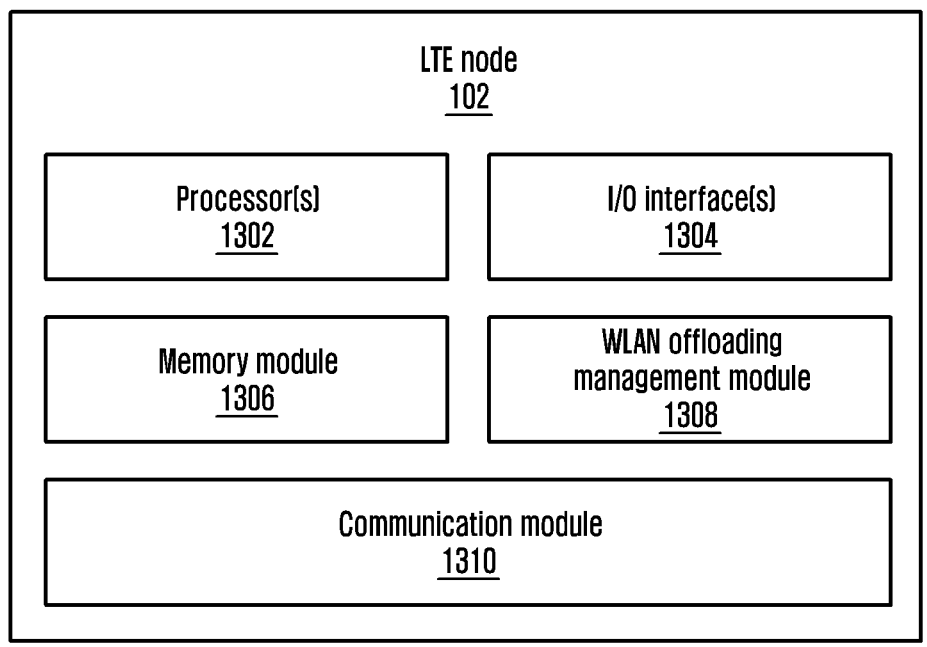
FIG. 13 is a block diagram of an LTE node, according to an embodiment of the present disclosure.

FIG. 13 is a block diagram of an LTE node, according to an embodiment of the present disclosure.

Referring to FIG. 13, the LTE node 102 may include at least one processor 1302, at least one input/output (I/O) interface 1304, a memory module 1306, a WLAN offloading management module 1308, and a communication module 1310. The at least one processor 1302 may be implemented as one or more microprocessors, microcomputers, microcontrollers, digital signal processors, central processing units, state machines, logic circuitries and so on that manipulates signals based on operational instructions. Among other capabilities, the at least one processor 1302 is configured to fetch and execute non-transitory computer-readable instructions stored in the memory module 1306.

The at least one I/O interface 1304 may include a variety of software and hardware interfaces, for example, a user interface and the like. The communication module 1310 may be configured to facilitate multiple communications within a wide variety of networks and protocol types, including networks, for example, WLAN, cellular networks such as LTE networks and the like that enable communication with a plurality of entities of the wireless communication system 100 such as the WLAN APs 106a through 106d, the WLAN AG 108, one or more of the UEs 104a through 104e, and other entities. The WLAN offloading management module 1308 may include routines, programs, objects, components, data structures, and so on, which perform particular tasks, functions or implement particular data types. The WLAN offloading management module 1308 may include programs or coded instructions that supplement applications and functions of the LTE node 102. The memory module 1306 may store data for the functions performed by the LTE node 102 such as a mapping table for the LTE QoS parameters to WLAN QoS parameters, which may be used during offloading of the DRBs to the WLAN if the LTE node 102 is configured to perform the mapping.

In an embodiment of the present disclosure, the WLAN offloading management module 1308 may be configured to perform one or more of the functions associated with the LT node 102 as described above with reference to FIGS. 1 through 12 to implement steps of the method 200 for performing offloading of the DRBs to the WLAN. Thus, the WLAN offloading management module 1308 may be configured to provide or assist in one or more functions such as mapping of the LTE QoS parameters to the WLAN QoS parameters (if implemented at the LTE node 102), and controlling the data rate for data transferred from the LTE node 102 to the WT node on the Xw interface, wherein the flow control mechanism may be implemented in at least one of the WT node and the UE.

Figure 14:
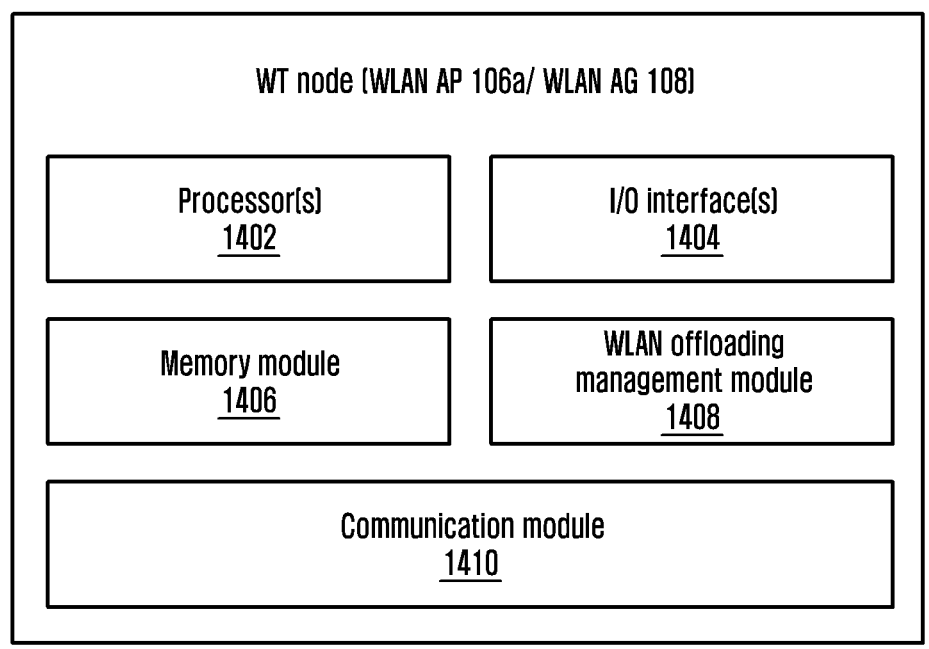
FIG. 14 is a block diagram of a WT node (WLAN AP or WLAN AG), according to an embodiment of the present disclosure.

FIG. 14 is a block diagram of a WT node (WLAN AP or WLAN AG), according to an embodiment of the present disclosure.

Referring to FIG. 14, the WT node (WLAN AP 106a or WLAN AG 108) may include at least one processor 1402, at least one input/output (I/O) interface 1404, a memory module 1406, a WLAN offloading management module 1408, and a communication module 1410. The at least one processor 1402 may be implemented as one or more microprocessors, microcomputers, microcontrollers, digital signal processors, central processing units, state machines, logic circuitries and so on that manipulates signals based on operational instructions. Among other capabilities, the at least one processor 1402 may be configured to fetch and execute a non-transitory computer-readable instructions stored in the memory module 1406.

The at least one I/O interface 1404 may include a variety of software and hardware interfaces, for example, a user interface and the like. The communication module 1410 may be configured to facilitate multiple communications within a wide variety of networks and protocol types, including networks, for example, WLAN, cellular networks such as LTE networks and the like, to communicate with a plurality of entities of the wireless communication system 100 such as LTE nodes including the LTE node 102 through the Xw interface, one or more of the UEs 104a through 104e through a WLAN interface and other entities. The WLAN offloading management module 1408 may include routines, programs, objects, components, data structures, and so on, which perform particular tasks, functions or implement particular data types. The WLAN offloading management module 1408 may include programs or coded instructions that supplement applications and functions of the WT node (WLAN AP 106a or WLAN AG 108). The memory module 1406 may store data for the functions of the WT node (WLAN AP 106a or WLAN AG 108) such as a mapping table for the LTE QoS parameters to WLAN QoS parameters, which be used during offloading of the DRBs to the WLAN if the WT node (such as the WLAN AP 106a) is configured to perform the mapping.

In an embodiment of the present disclosure, the WLAN offloading management module 1408 may be configured to perform one or more of the functions associated the WT node (WLAN AP 106a or WLAN AG 108) as described above with reference to FIGS. 1 through 12 to implement steps of the method 200 for performing offloading of the DRBs to the WLAN. Thus, the WLAN offloading management module 1408 may be configured to provide or assist in one or more functions such as mapping of the LTE QoS parameters to the WLAN QoS parameters, and assisting the LTE node 102 to control the data rate on the Xw interface using the flow control mechanism, if implemented at the WT node. The functions implemented by the WT node may be carried out by one or more entities within the WT node such as the adapter entity, the bearer management entity, the queue management entity, and the like.

Figure 15:
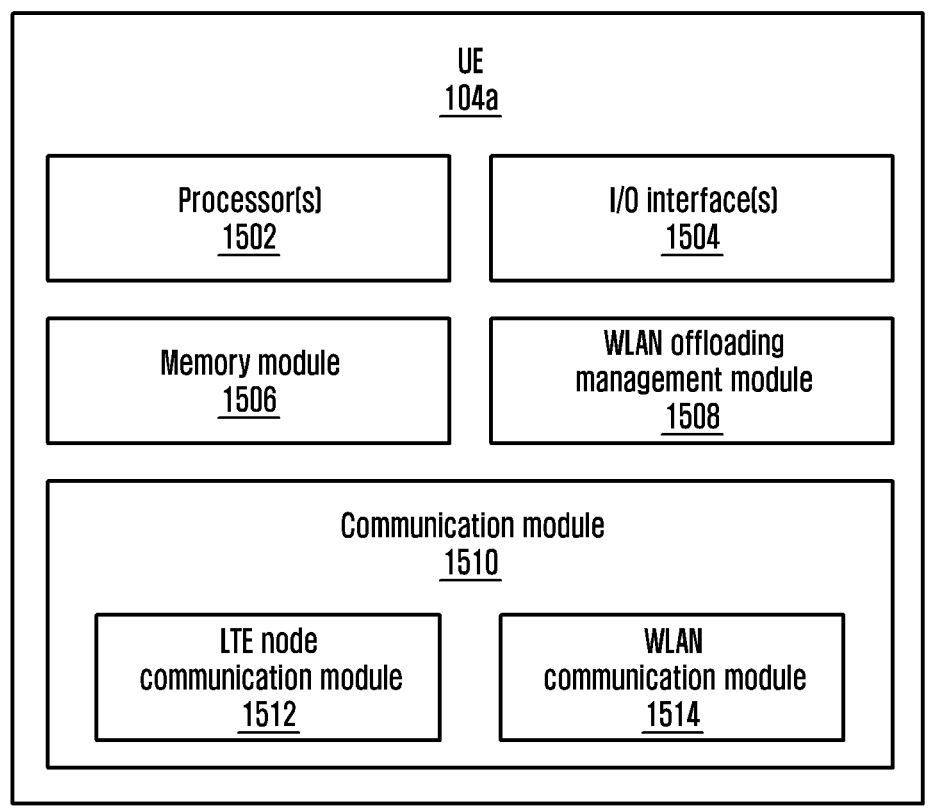
FIG. 15 is a block diagram of a UE, according to an embodiment of the present disclosure.

FIG. 15 is a block diagram of a UE, according to an embodiment of the present disclosure.

Referring to FIG. 15, the UE 104a may include at least one processor 1502, at least one input/output (I/O) interface 1504, a memory module 1506, a WLAN offloading management module 1508, and a communication module 1510. The at least one processor 1502 may be implemented as one or more microprocessors, microcomputers, microcontrollers, digital signal processors, central processing units, state machines, logic circuitries, and so on that manipulates signals based on operational instructions. Among other capabilities, the at least one processor 1502 may be configured to fetch and execute non-transitory computer-readable instructions stored in the memory 1506.

The at least one I/O interface 1504 may include a variety of software and hardware interfaces, for example, a user interface and the like. The communication module 1510 may include an LTE communication module 1512 to communicate with the entities of the LTE network such as the LTE node 102. Further, the communication module 1510 may include a WLAN communication module 1514 to enable the UE 104a to communicate with the WT node (WLAN AP 106a or WLAN AG 108) over a WLAN interface during offloading of the DRBs to the WLAN. Further, the communication module 1510 may facilitate multiple communications within a wide variety of networks and protocol types, including networks, for example, WLAN, cellular networks such as LTE networks, device-to-device communication, and the like. The WLAN offloading management module 1508 may include routines, programs, objects, components, data structures, and so on, which perform particular tasks, functions or implement particular data types. The WLAN offloading management module 1508 may include programs or coded instructions that supplement applications and functions of the UE 104a. The memory module 1506 may store data for the functions of the PDCP status reports for the flow control mechanism implemented in the UE 104a for offloaded DRBs to the WLAN.

In an embodiment of the present disclosure, the WLAN offloading management module 1508 may be configured to perform one or more of the functions associated the UE 104a as described above with reference to FIGS. 1 through 12 to implement steps of the method 200 for performing offloading of the DRBs to the WLAN. Thus, the WLAN offloading management module 1508 may be configured to provide or assist in one or more functions of the WT node and the LTE node 102.

The embodiments of the present disclosure disclosed herein may be implemented through at least one software program running on at least one hardware device and performing network management functions to control the network elements. The network elements shown in FIGS. 1 through 15 include blocks which may be at least one of a hardware device, or a combination of a hardware device and a software module.

The foregoing description of the embodiments of the present disclosure so fully reveals the general nature of the embodiments herein that others may, by applying current knowledge, readily modify and/or adapt for various applications such embodiments without departing from the scope of the present disclosure, and, therefore, such adaptations and modifications are intended to be comprehended within the scope of the present disclosure. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the scope of the present disclosure as defined by the appended claims and their equivalents.

What is claimed is:

1. A method performed by a wireless local area network (WLAN) termination (WT) node in a second radio access technology (RAT), the method comprising:
   receiving, from a base station in a first RAT, a WT addition request message including quality of service (QoS) parameters for at least one bearer;
   transmitting, to the base station, a WT addition request acknowledge message including an identity of an admitted bearer among the at least one bearer;
   receiving, from the base station, data for a terminal; and
   transmitting, to a WLAN access point through a local interface between the WT node and the WLAN access point, a packet based on the data,
   wherein a header of the packet for the local interface includes QoS information used to map QoS class identifier (QCI) information of the data to a WLAN access class category.

2. The method of claim 1, wherein the header of the packet includes a medium access control (MAC) address of the terminal as a destination address and a MAC address of the WLAN access point as a source address.

3. The method of claim 1, wherein the data includes a packet data convergence protocol (PDCP) protocol data unit (PDU), and
   wherein a PDCP header of the PDCP PDU includes a data radio bearer (DRB) identity for a WLAN offload and a logical channel identity (LCD) of an evolved packet system (EPS) bearer.

4. The method of claim 1, wherein a PDCP PDU included in the packet is queued using a WLAN access class based on the QoS information in the WLAN access point.

5. The method of claim 1, further comprising determining an establishment of a bearer as failed, in case the QoS parameter included in the WT addition request message includes a QCI value indicating a guaranteed bit rate (GBR) bearer and does not include GBR QoS information.

6. A method performed by a base station in a first radio access technology (RAT), the method comprising:
   transmitting, to a wireless local area network (WLAN) termination (WT) node in a second RAT, a WT addition request message including quality of service (QoS) parameters for at least one bearer;
   receiving, from the WT node, a WT addition request acknowledge message including an identity of an admitted bearer among the at least one bearer;
   obtaining data to be transmitted to a terminal; and
   transmitting, to the WT node, the data,
   wherein a packet based on the data is transmitted to a WLAN access point through a local interface between the WT node and the WLAN access point, and
   wherein a header the packet for the local interface includes QoS information used to map QoS class identifier (QCI) information of the data to a WLAN access class category.

7. The method of claim 6, wherein the header of the packet includes a medium access control (MAC) address of the terminal as a destination address and a MAC address of the WLAN access point as a source address, wherein the data includes a packet data convergence protocol (PDCP) protocol data unit (PDU), and wherein a PDCP header of the PDCP PDU includes a data radio bearer (DRB) identity for a WLAN offload and a logical channel identity (LCD) of an evolved packet system (EPS) bearer.

8. The method of claim 6, wherein an establishment of a bearer is determined as failed, in case the QoS parameter included in the WT addition request message includes a QCI value indicating a guaranteed bit rate (GBR) bearer and does not include GBR QoS information.

9. A method performed by a wireless local area network (WLAN) access point in a second radio access technology, the method comprising:

receiving, from a WLAN termination (WT) node through a local interface between the WT node and the WLAN access point, a packet based on data obtained from a base station;

identifying a WLAN access class category mapped to quality of service (QoS) class identifier (QCI) information of the data based on QoS information included in a header of the packet for the local interface;

queueing a packet data convergence protocol (PDCP) protocol data unit (PDU) of the packet based on the WLAN access class category; and transmitting, to a terminal, the PDCP PDU.

10. The method of claim 9, wherein the header of the packet includes a medium access control (MAC) address of the terminal as a destination address and a MAC address of the WLAN access point as a source address, and wherein a PDCP header of the PDCP PDU includes a data radio bearer (DRB) identity for a WLAN offload and a logical channel identity (LCD) of an evolved packet system (EPS) bearer.

11. A wireless local area network (WLAN) termination (WT) node in a second radio access technology (RAT), the WT node comprising:

a transceiver; and a controller configured to:

receive, from a base station in a first RAT via the transceiver, a WT addition request message including quality of service (QoS) parameters for at least one bearer, transmit, to the base station via the transceiver, a WT addition request acknowledge message including an identity of an admitted bearer among the at least one bearer, receive, from the base station via the transceiver, data for a terminal, and transmit, to a WLAN access point via the transceiver through a local interface between the WT node and the WLAN access point, a packet based on the data, wherein a header the packet for the local interface includes QoS information used to map QoS class identifier (QCI) information of the data to a WLAN access class category.

12. The WT node of claim 11, wherein the header of the packet includes a medium access control (MAC) address of the terminal as a destination address and a MAC address of the WLAN access point as a source address.

13. The WT node of claim 11, wherein the data includes a packet data convergence protocol (PDCP) protocol data unit (PDU), and wherein a PDCP header of the PDCP PDU includes a data radio bearer (DRB) identity for a WLAN offload and a logical channel identity (LCD) of an evolved packet system (EPS) bearer.

14. The WT node of claim 11, wherein a PDCP PDU included in the packet is queued using a WLAN access class based on the QoS information in the WLAN access point.

15. The WT node of claim 11, wherein the controller is further configured to determine an establishment of a bearer as failed, in case the QoS parameter included in the WT addition request message includes a QCI value indicating a guaranteed bit rate (GBR) bearer and does not include GBR QoS information.

16. A base station in a first radio access technology (RAT), the base station comprising:

a transceiver; and a controller configured to:

transmit, to a wireless local area network (WLAN) termination (WT) node in a second RAT via the transceiver, a WT addition request message including quality of service (QoS) parameters for at least one bearer, receive, from the WT node via the transceiver, a WT addition request acknowledge message including an identity of admitted bearer among the at least one bearer, obtain data to be transmitted to a terminal, and transmit, to the WT node via the transceiver, the data, wherein a packet based on the data is transmitted to a WLAN access point through a local interface between the WT node and the WLAN access point, and wherein a header the packet for the local interface includes QoS information used to map QoS class identifier (QCI) information of the data to a WLAN access class category.

17. The base station of claim 16, wherein the header of the packet includes a medium access control (MAC) address of the terminal as a destination address and a MAC address of the WLAN access point as a source address, wherein the data includes a packet data convergence protocol (PDCP) protocol data unit (PDU), and wherein a PDCP header of the PDCP PDU includes a data radio bearer (DRB) identity for a WLAN offload and a logical channel identity (LCD) of an evolved packet system (EPS) bearer.

18. The base station of claim 16, wherein an establishment of a bearer is determined as failed, in case the QoS parameter included in the WT addition request message includes a QCI value indicating a guaranteed bit rate (GBR) bearer and does not include GBR QoS information.

19. A wireless local area network (WLAN) access point in a second radio access technology, the WLAN access point comprising:

a transceiver; and a controller configured to:

receive, from a WLAN termination (WT) node via the transceiver through a local interface between the WT node and the WLAN access point, a packet based on data obtained from a base station, identify a WLAN access class category mapped to quality of service (QoS) class identifier (QCI) information of the data based on QoS information included in a header of the packet for the local interface, queue a packet data convergence protocol (PDCP) protocol data unit (PDU) of the packet based on the WLAN access class category, and transmit, to a terminal via the transceiver, the PDCP PDU.

20. The WLAN access point of claim 19, wherein the header of the packet includes a medium access control (MAC) address of the terminal as a destination address and a MAC address of the WLAN access point as a source address, and wherein a PDCP header of the PDCP PDU includes a data radio bearer (DRB) identity for a WLAN offload and a logical channel identity (LCD) of an evolved packet system (EPS) bearer.

* * * * *